United States Patent
Trikha et al.

(10) Patent No.: US 8,355,752 B2
(45) Date of Patent: Jan. 15, 2013

(54) USING LO SHIFTING TO PREVENT A LOCAL TRANSCEIVER FROM INTERFERING WITH AN FM RADIO

(75) Inventors: Pushp Trikha, San Diego, CA (US); Luca Blessent, Bridgewater, NJ (US); Xiaoyong Li, Santa Clara, CA (US); Rahul A. Apte, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 560 days.

(21) Appl. No.: 12/610,600

(22) Filed: Nov. 2, 2009

(65) Prior Publication Data
US 2011/0009161 A1    Jan. 13, 2011

Related U.S. Application Data

(60) Provisional application No. 61/224,382, filed on Jul. 9, 2009.

(51) Int. Cl.
*H04M 1/00* (2006.01)
*H04B 1/16* (2006.01)
*H04B 7/00* (2006.01)
*H04B 1/10* (2006.01)

(52) U.S. Cl. ............... 455/556.1; 455/208; 455/257; 455/296

(58) Field of Classification Search ........... 455/550.1, 455/556.1, 192.1, 192.2, 205, 208, 255, 257, 455/258, 259, 265, 296
See application file for complete search history.

(56) References Cited

U.S. PATENT DOCUMENTS

| 2004/0165428 | A1 | 8/2004 | Odagawa et al. |
| 2012/0142284 | A1* | 6/2012 | Shi et al. ............... 455/77 |

FOREIGN PATENT DOCUMENTS

| DE | 19546406 C1 | 5/1997 |
| EP | 1739846 A2 | 1/2007 |

OTHER PUBLICATIONS

International Search Report and Written Opinion—PCT/US2010/041435—ISA—EPO—Nov. 2, 2010.

* cited by examiner

*Primary Examiner* — Nguyen Vo
(74) *Attorney, Agent, or Firm* — Eric Ho

(57) ABSTRACT

A cellular telephone includes cellular telephone circuitry and an FM receiver. An FM signal being received is downconverted by a mixer. The downconverted signal is processed to generate an FM signal that is supplied to a digital IF filter. If a blocker emitted by the cellular telephone circuitry would interfere with receiving of the FM signal due to interaction of an LO harmonic with the blocker if a conventional LO frequency were used, then a different LO frequency is used. Subsequent processing of the downconverted FM signal (for example, by a digital complex conjugate selector and an IF rotator) results in the signal supplied to the digital IF filter having the same center frequency as the digital IF filter despite the use of the different LO frequency. In some embodiments, the LO is shifted by different amounts depending on cellular telephone mode and on the FM signal.

21 Claims, 18 Drawing Sheets

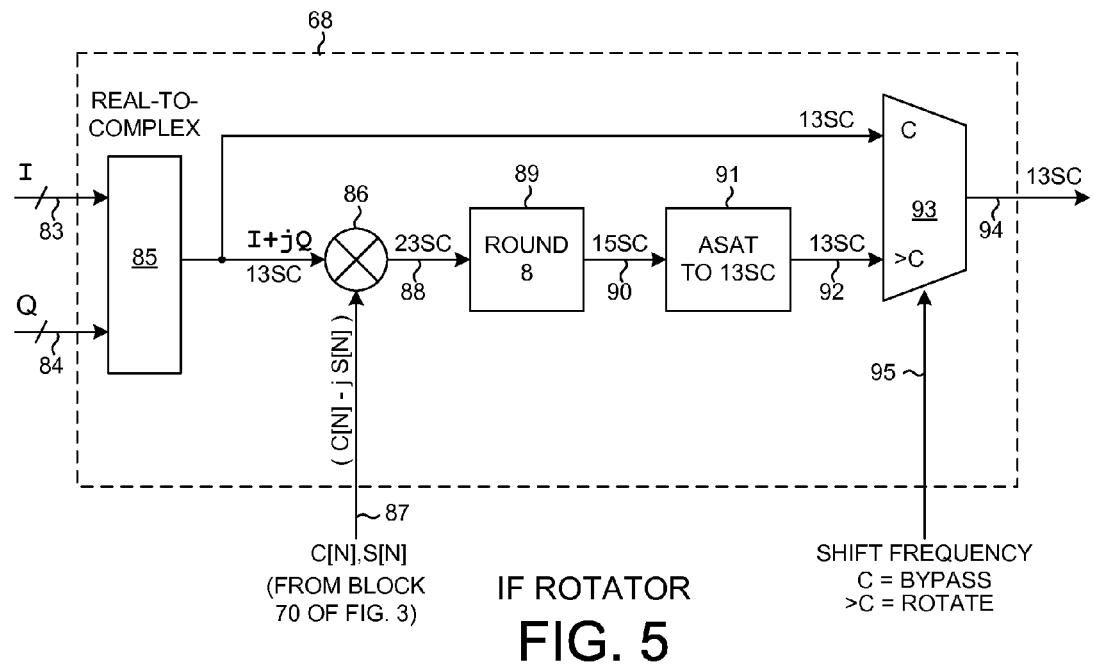
FIG. 5 IF ROTATOR
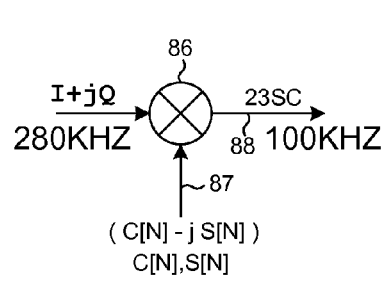
FIG. 6 MULTIPLIER OPERATION
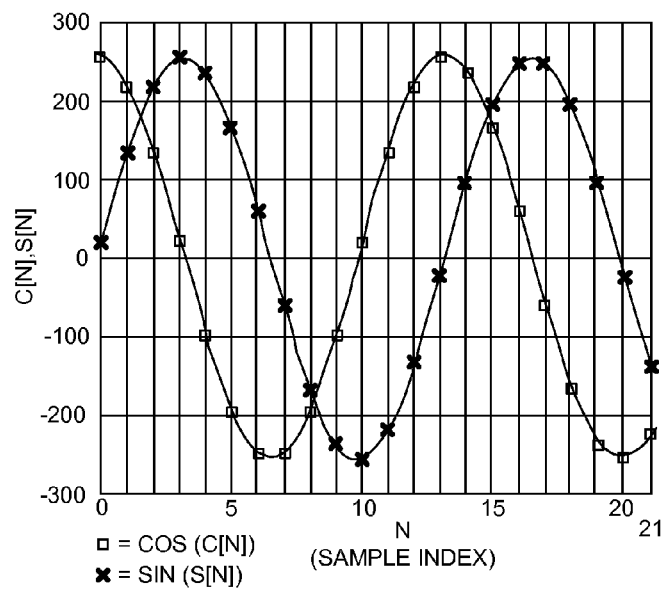
FIG. 7 180 KHZ DIGITAL SINUSOID

| N | C[N] | S[N] |
|---|------|------|
| 0 | 255 | 20 |
| 1 | 218 | 134 |
| 2 | 134 | 218 |
| 3 | 20 | 255 |
| 4 | -98 | 237 |
| 5 | -195 | 166 |
| 6 | -249 | 60 |
| 7 | -249 | -60 |
| 8 | -195 | -166 |
| 9 | -98 | -237 |
| 10 | 20 | -255 |
| 11 | 134 | -218 |
| 12 | 218 | -134 |
| 13 | 255 | -20 |
| 14 | 237 | 98 |
| 15 | 166 | 195 |
| 16 | 60 | 249 |
| 17 | -60 | 249 |
| 18 | -166 | 195 |
| 19 | -237 | 98 |
| 20 | -255 | -20 |
| 21 | -218 | -134 |

TIME

180 KHZ DIGITAL SINUSOID

FIG. 8

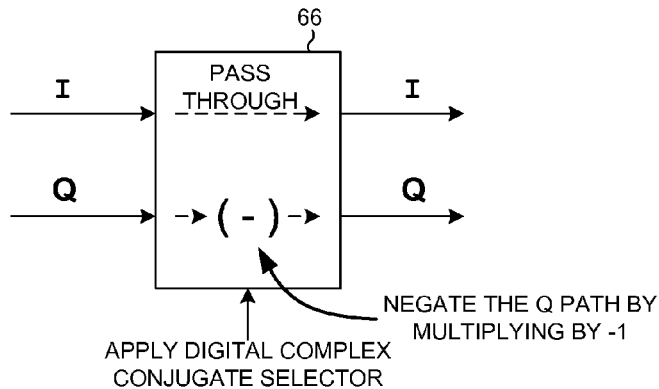

DIGITAL COMPLEX CONJUGATE SELECTOR
(SCHEMATIC REPRESENTATION)

FIG. 9

|  | NO HARMONIC MIXING PROBLEM | EXAMPLE #1 (FIG. 11-17) | EXAMPLE #2 (FIG. 18-25) | EXAMPLE #3 (FIG. 26-31) |
|---|---|---|---|---|
| FM STATION BEING RECEIVED | DON'T CARE | 93.85 - 93.95 MHZ | 93.85 - 94.15 MHZ | 93.65 - 93.80 MHZ |
| CELLULAR TELEPHONE OPERATING MODE | OFF | CDMA 1X | WCDMA | WCDMA |
| PROBLEMATIC CELLULAR TELEPHONE BLOCKER | NONE | 844.3 MHZ | 844.3 MHZ | 844.3 MHZ |
| LO IS SHIFTED FROM NORMAL LO FREQUENCY BY | 0 | +200 KHZ | +380 KHZ | -180 KHZ |
| FREQUENCY OFFSET (DIFFERENCE BETWEEN LO AND FM STATION CENTER) | -100 KHZ | +100 KHZ | +280 KHZ | -280 KHZ |
| SET ANALOG FILTER CENTER FREQUENCY TO | 100 KHZ | 100 KHZ | 280 KHZ | 280 KHZ |
| APPLY ANALOG COMPLEX CONJUGATE SELECTOR | NO | YES | YES | NO |
| APPLY DIGITAL COMPLEX CONJUGATE SELECTOR | NO | YES | YES | NO |
| IF ROTATE BY | 0 | 0 | -180 KHZ | -180 KHZ |

LOOKUP CONTROL TABLE

FIG. 10

MIX DOWN TO IF AND
SET ANALOG FILTER RESPONSE

APPLY ANALOG COMPLEX CONJUGATE SELECTOR

APPLY DIGITAL COMPLEX CONJUGATE SELECTOR

FM SIGNAL IS NOW PROPERLY CENTERED AT
100KHZ FOR DIGITAL FILTER

FM RECEIVER OPERATION
(EXAMPLE #1)

MIX DOWN TO IF AND
SET ANALOG FILTER RESPONSE

APPLY ANALOG COMPLEX CONJUGATE
SELECTOR

APPLY DIGITAL COMPLEX CONJUGATE
SELECTOR

IF ROTATE BY -180KHZ

FM SIGNAL IS PROPERLY CENTERED AT 100KHZ FOR DIGITAL FILTER

MIX DOWN TO IF AND
SET ANALOG FILTER RESPONSE

IF ROTATE BY -180KHZ

FM SIGNAL IS PROPERLY CENTERED AT
100KHZ FOR DIGITAL FILTER

USING LO SHIFTING TO PREVENT A LOCAL TRANSCEIVER FROM INTERFERING WITH AN FM RADIO

CROSS-REFERENCE TO RELATED APPLICATION

This application claims the benefit under 35 U.S.C. §119 of Provisional Application Ser. No. 61/224,382, filed Jul. 9, 2009, said provisional application is incorporated herein by reference.

BACKGROUND INFORMATION

1. Technical Field

The present disclosure relates to Frequency Modulation (FM) radio receivers.

2. Background Information

The popularity of cellular telephones and other personal handheld communication devices has led to more and more functionality being built into cellular telephones. An FM radio receiver/transmitter functionality may, for example, be built into the small form factor of a cellular telephone along with the cellular telephone communication circuitry. Unfortunately, interference problems can occur due to the close proximity of the FM radio circuitry and the cellular telephone circuitry. If, for example, a user is listening to an FM radio station using the FM radio functionality of the cellular telephone, and if the cellular telephone then performs a particular cellular telephone communication function, then the cellular telephone circuitry may emit a relatively strong blocker transmission that interferes with proper FM radio reception. The type of interference, and when it occurs, can vary in relatively complex ways depending on the usage of FM radio receiver and depending on the operating mode of the cellular telephone. A cellular telephone that has an FM radio functionality that does not suffer from such problems is desired.

SUMMARY

A cellular telephone includes cellular telephone circuitry and an FM receiver. The cellular telephone circuitry and the FM receiver are in close physical proximity. An incoming FM signal being received by the FM receiver is downconverted by a mixer to generate a downconverted FM signal. The mixer is driven by a local oscillator signal (LO). The downconverted FM signal is processed to generate a processed FM signal that is supplied to a digital IF filter. After passing through the digital IF filter, the signal is FM demodulated.

If a blocker emitted by the cellular telephone circuitry would interfere with receiving of the incoming FM signal (for example, due to interaction of a ninth harmonic of the LO with the blocker if a conventional LO frequency were used), then a different LO frequency is used to drive the mixer. Such a different LO frequency is also referred to here as a "shifted" LO frequency. The term "shifted" refers to the difference between the LO frequency and the LO frequency that would conventionally be used. The term "shifted" does not mean that the frequency is gradually moved over time. Rather, the LO frequency can simply be set to the shifted LO frequency. After downconversion using the shifted LO frequency, subsequent processing of the downconverted FM signal (for example, by an analog complex bandpass filter, analog-to-digital converters, a digital complex conjugate selector, a decimation digital filter, and an IF rotator) results in the processed FM signal supplied to the digital IF filter having the same center frequency as the center frequency of the digital IF filter despite the use of the different LO frequency.

In some embodiments, the LO is shifted (as compared to using the conventional LO frequency) by different amounts depending on the cellular telephone mode and depending on the center frequency of the FM signal being received. Using the shifted LO prevents unwanted mixing of a harmonic of the LO with cellular telephone blocker signals emitted by the cellular telephone circuitry when the cellular telephone circuitry is operating in a particular cellular telephone mode. Regardless of whether a shifted LO frequency is used or not in a given operating situation of the FM receiver, the processing of the downconverted FM signal results in the processed FM signal as supplied to the digital IF filter having a center frequency that is substantially identical to the center frequency if the digital IF filter. The center frequency of the digital IF filter remains the same regardless of how or whether the LO frequency is shifted. In situations in which the cellular telephone blocker is a wideband blocker, the maximum amount the LO must be shifted to avoid the harmonic mixing problem described above is reduced by shifting the LO in different ways depending on which one of a plurality of frequency ranges contains the FM signal being received. For example, in order to avoid excessive IF frequency shifts, the LO can be shifted in a first way where the FM signal being received is in a first frequency range, whereas the LO can be shifted a second way where the FM signal being received is in a second frequency range.

Although a particularly advantageous use of the LO shifting technique described above involves using a single digital IF filter with a single fixed center frequency to avoid harmonic mixing problems, the LO shifting technique can be used in a somewhat less advantageous way by using different LO shifts to avoid harmonic mixing problems but using one or more digital IF filters having different center frequencies depending on the particular LO shift employed. In such less advantageous applications, a single digital IF filter having an adjustable center frequency can be used or multiple digital IF filters each having a different center frequency can be used.

The foregoing is a summary and thus contains, by necessity, simplifications, generalizations and omissions of detail; consequently, those skilled in the art will appreciate that the summary is illustrative only and does not purport to be limiting in any way. Other aspects, inventive features, and advantages of the devices and/or processes described herein, as defined solely by the claims, will become apparent in the non-limiting detailed description set forth herein.

BRIEF DESCRIPTION OF THE DRAWINGS

FIG. 5 is a diagram of the IF rotator 68 of FIG. 3.

FIG. 6 is a diagram that illustrates how multiplier 86 of the IF rotator 68 of FIG. 5 performs a frequency shifting function.

FIG. 7 is a diagram that shows how the streams of C[N] and S[N] values supplied to the multiplier 86 of FIG. 5 define a cosine wave and a sine wave.

FIG. 8 is a table that sets for the sequence of C[N] and S[N] values of FIG. 7.

FIG. 9 is a diagram that illustrates now the digital complex conjugate selector 66 of FIG. 3 operates.

FIG. 10 is a table that illustrates how the frequency synthesizer 43, the analog complex bandpass filter 38, the digital complex conjugate selector 66 and the IR rotator 68 of the FM receiver of FIG. 3 are controlled in different cellular telephone operating modes to prevent unwanted interference with the receiving of an FM signal.

DETAILED DESCRIPTION

Figure 1:
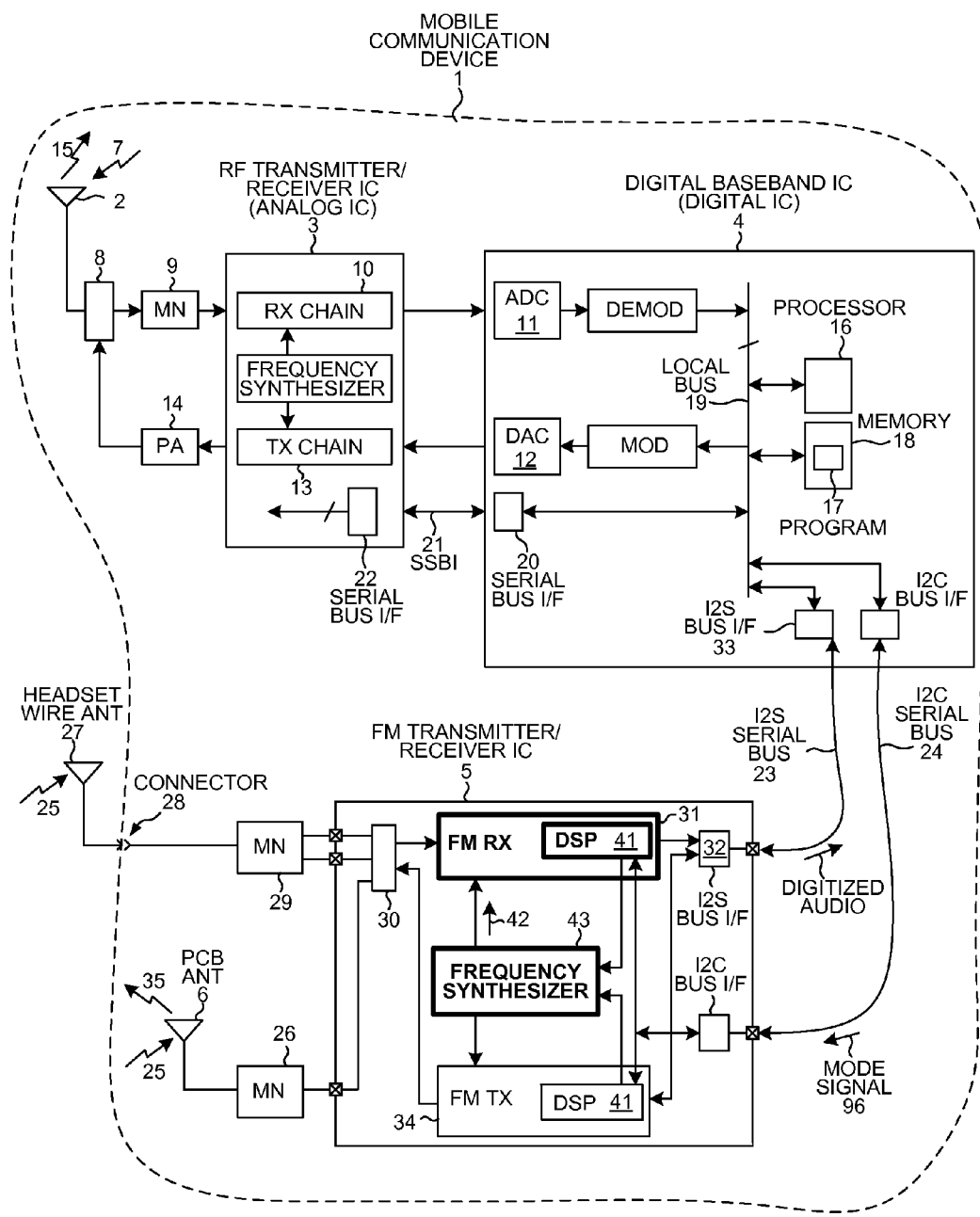
FIG. 1 is a diagram of a mobile communication device 1 (for example, a cellular telephone) that includes an FM transmitter/receiver integrated circuit 5 in accordance with one novel aspect.

FIG. 1 is a diagram of a mobile communication device 1. In one example, mobile communication device 1 is a cellular telephone. In another example, mobile communication device 1 is a Personal Digital Assistant (PDA) or similar handheld personal communication device. Device 1 includes a cellular telephone functionality as well as a FM radio functionality within a single small handheld form factor and enclosure. The enclosure is not illustrated in FIG. 1. Device 1 includes (among other parts not illustrated) an antenna 2 usable for receiving and transmitting cellular telephone communications, an RF transceiver integrated circuit 3, a digital baseband integrated circuit 4, an FM transmitter/receiver integrated circuit 5, and an antenna 6 usable for receiving and transmitting FM radio communications.

In one very simplified explanation of the operation of the cellular telephone functionality, if device 1 is being used to receive audio information as part of a cellular telephone conversation, then an incoming transmission 7 is received on antenna 2. The signal passes through a duplexer 8 and a matching network 9 and is processed by a receive chain 10 of RF transceiver integrated circuit 3. After being digitized by an Analog-to-Digital Converter (ADC) 11, and being demodulated and decoded in digital baseband integrated circuit 4, the resulting audio information may, for example, be used to drive a speaker (not shown) such that a user of device 1 can hear another speaker in the cellular telephone conversation.

If, on the other hand, device 1 is to be used to transmit to audio information as part of the cellular telephone conversation, then a microphone (not shown) that is part of device 1 receives sound and converts that sound into an electrical signal. The electrical signal is converted into a stream of digital values of audio information. This digitized audio information is encoded and modulated in digital baseband integrated circuit 4. It is then converted into analog form by a Digital-to-Analog Converter (DAC) 12 in digital baseband integrated circuit 4. The resulting analog signal is filtered and upconverted in a transmit chain 13 in RF transceiver integrated circuit 3. After being amplified by power amplifier 14, the signal is transmitted from antenna 2 as transmission 15. The downconversion occurring in receive chain 10 and the upconversion occurring in transmit chain 13 is controlled by a processor 16 in digital baseband integrated circuit 4. Processor 16 executes a set of processor-executable instructions 17 out of a processor-readable medium 18 within digital baseband integrated circuit 4. Processor 16 controls RF transceiver integrated circuit 3 by sending control information to the RF transceiver integrated circuit 3 via local bus 19, serial bus interface 20, serial bus 21, and serial bus interface 22.

In addition to the cellular telephone functionality described above, device 1 has an ability to receive and to transmit FM radio communications (commercial FM VHF broadcast band communications from approximately 76 MHz to approximately 108 MHz). To provide this FM microtransmitter radio functionality, device 1 includes FM transmitter/receiver integrated circuit 5 that is coupled to digital baseband integrated circuit 4 via a serial buses 23 and 24. A user may, for example, use device 1 to receive and to listen to ordinary FM broadcast radio stations in the FM VHF band. When device 1 is used in this way, an FM radio signal 25 is received onto printed circuit board (PCB) antenna 6, and is supplied via a matching network 26 to FM transmitter/receiver integrated circuit 5. In the alternative, if a headset 27 is attached to device 1 via a connector 28, then FM radio signal 25 is received onto antenna 27 and is supplied via matching network 29 to FM transmitter/receiver integrated circuit 5. The incoming FM signal 25 passes through a front-end matching block 30 and is downconverted and FM demodulated by an FM receiver functionality 31. The resulting information received can then be communicated via serial bus interface 32, serial bus 23, and serial bus interface 33 to digital baseband integrated circuit 4. Digital baseband integrated circuit 4 can then drive the speaker or headset of the user such that the user can listen to the FM broadcast information. In this way, a user of device 1 can use device 1 to listen to ordinary FM radio stations in the 76 MHz to 108 MHz FM band.

Device 1 may also be used to transmit FM signals in the same FM VHF band. A user may, for example, use the audio system of an automobile or of a home stereo system to listen to audio information stored on the cellular telephone. In one example, an audio file such as an MP3 file is stored on device 1 and the user wishes to hear audio of the file on the sound system of the user's automobile. To do this, the MP3 file is communicated from digital baseband integrated circuit 4 via serial bus interface 33, serial bus 23, and serial bus interface 32 to FM transmitter/receiver integrated circuit 5. The MP3 information is converted into a stream of audio information that is then FM modulated onto a carrier by an FM transmitter functionality 34. An FM radio signal is then driven onto antenna 6. The resulting FM transmission 35 may then be received by the FM radio tuner in the user's automobile. The FM radio of the automobile then receives the FM transmission 35 and drives the speakers in the automobile as it would if it were tuned to receive an ordinary FM radio station. In this way, the user can use device 1 to play MP3 music in the user's automobile where the MP3 music is stored in device 1. This can be accomplished without connecting any wires between device 1 and the FM radio system of the automobile.

Figure 2:
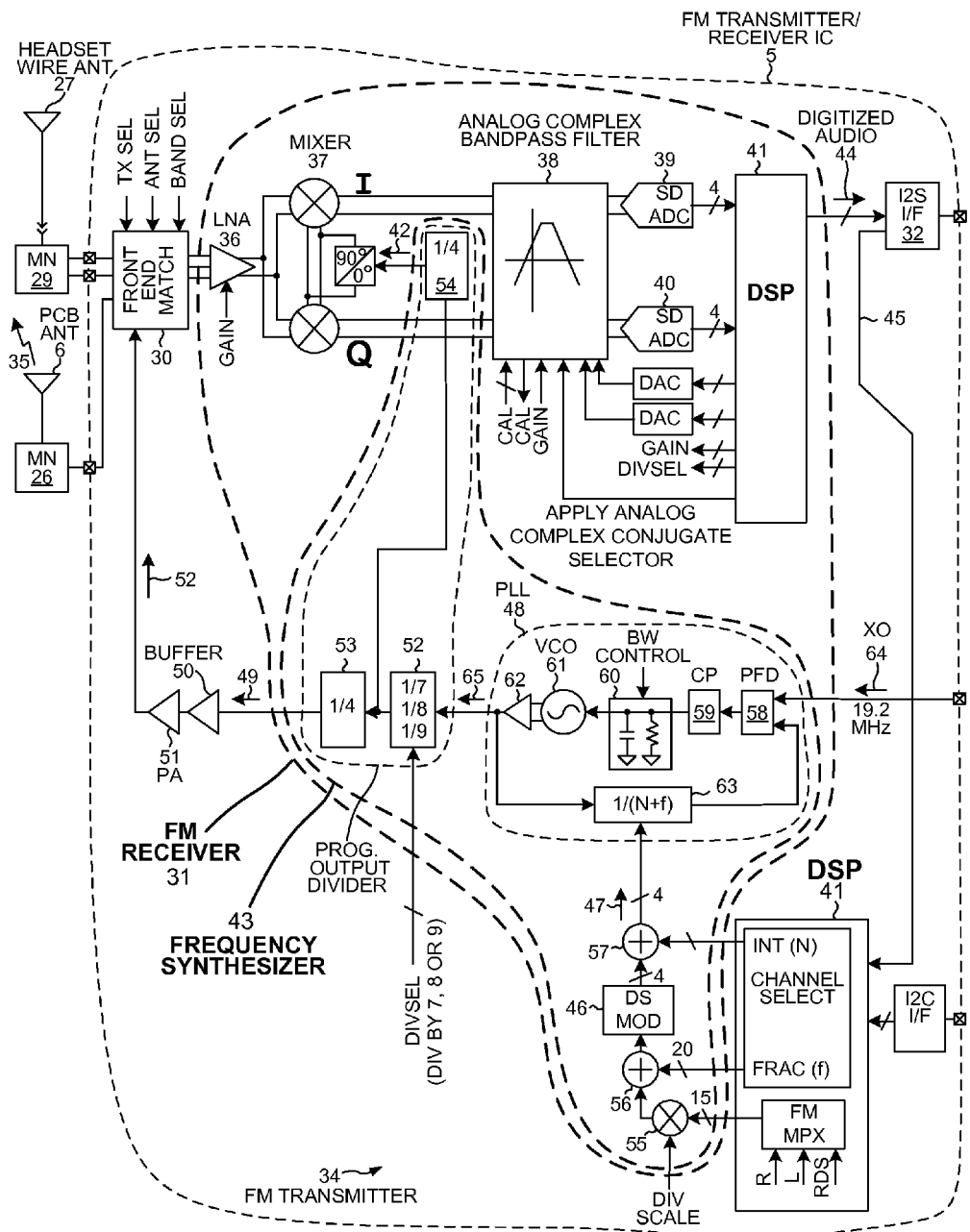
FIG. 2 is a more detailed diagram of the FM transmitter/receiver integrated circuit 5 of FIG. 1. The FM transmitter/receiver integrated circuit 5 includes the FM radio receiver 31.

FIG. 2 is a more detailed diagram of the FM transmitter/receiver integrated circuit 5 of FIG. 1. The FM receive path extends from PCB antenna 6 or from headset wire antenna 27, through matching network 26 or 29, onto FM transmitter/receiver integrated circuit 5, through transmit/receive (TR) front end switch and matching block 30, through a Low Noise Amplifier (LNA) 36, through a quadrature mixer block 37, through an analog complex bandpass filter 38, through a pair of Sigma-Delta Analog-to-Digital Converters (SD ADCs) 39 and 40, through Digital Signal Processor (DSP) 41, through serial bus interface 32, and across serial bus 23 to digital baseband integrated circuit 4. Arrow 44 represents the stream of digitized audio information. A local oscillator signal (LO) 42 generated by a frequency synthesizer 43 is supplied to mixer block 37. The frequency of the LO signal 42 is adjusted to tune the FM receiver.

The FM transmit path extends from serial bus interface 32, through conductors 45, and to DSP block 41. DSP block 41 is illustrated as two blocks in FIG. 2 in order to simplify the drawing. It is to be understood, however, that the two DSP blocks pictured represent a single DSP processor functionality. DSP 41 and an associated sigma-delta modulator 46 operate together to supply a stream 47 of digital values to the Phase-Locked Loop (PLL) 48 of frequency synthesizer 43. This stream of digital values 47 causes frequency synthesizer 43 to output an FM signal 49. FM signal 49 is buffered by buffer 50 and is amplified by a power amplifier (PA) 51. Amplified FM signal 52 then passes through Front-End Match TR Switch 30, and to an antenna 6 for transmission. Accordingly, the same frequency synthesizer 43 is used in both the receive path and in the transmit path.

Frequency synthesizer 43 is now described in more detail. Frequency synthesizer 43 includes PLL 48, a programmable output divider 52-54, delta-sigma modulator 46, a multiplier 55, a summer 56 and a summer 57. PLL 48 includes a Phase-Frequency Detector (PFD) 58, a charge pump 59, a loop filter 60, a Voltage-Controlled Oscillator (VCO) 61, a VCO buffer 62, and a loop divider 63. A 19.2 MHz reference clock signal 64 is supplied from an external reference (for example, from an external crystal oscillator). PLL 48, under the control of DSP 41 and delta-sigma modulator 46, operates as a fractional-N PLL. DSP 41, through digital control signals INT(N) and FRAC(f), sets the frequency of the PLL output signal 65 and therefore also controls the frequency of LO signal 42.

Figure 3:
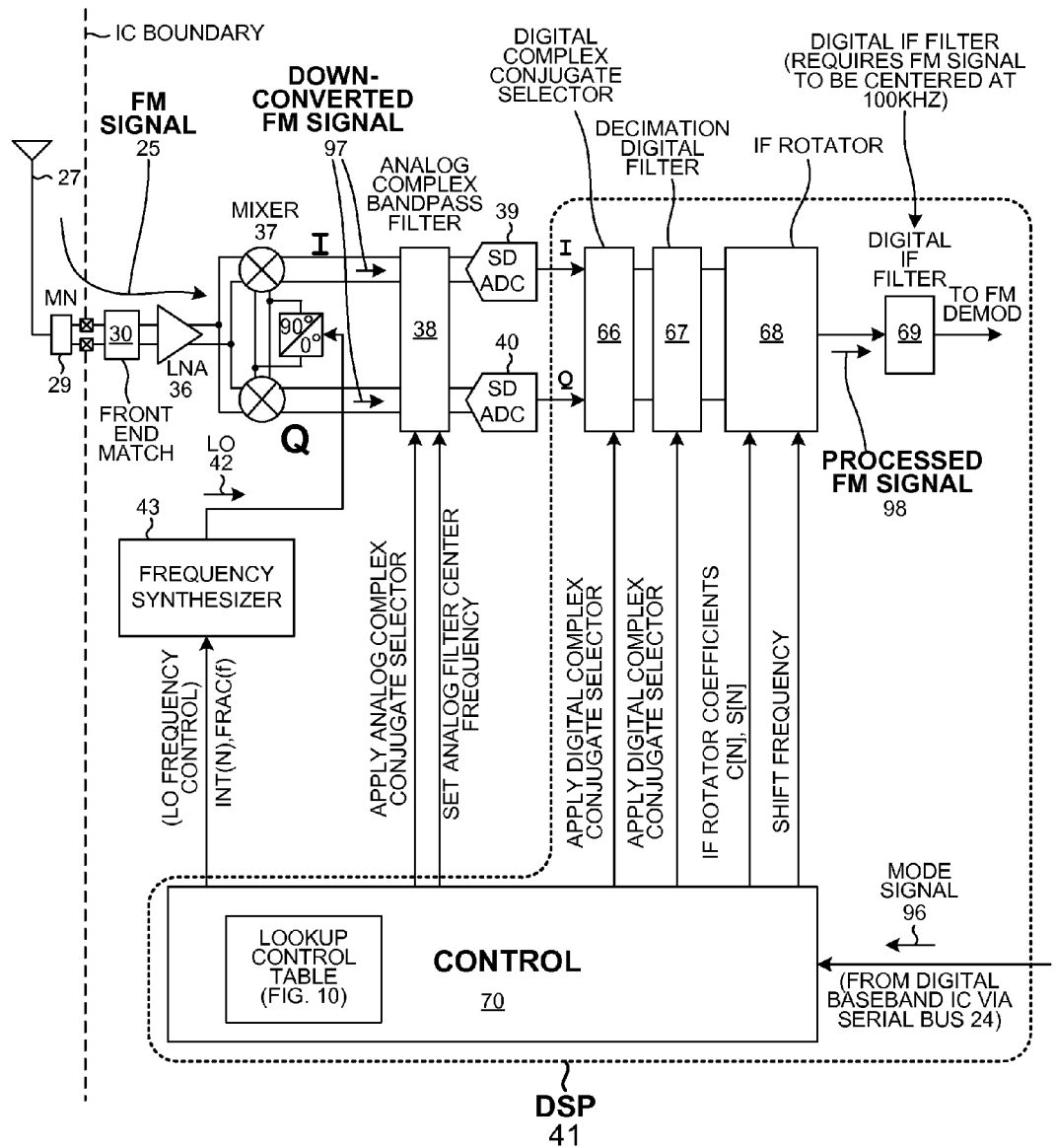
FIG. 3 is a more detailed diagram of the FM receiver 31 of the FM transmitter/receiver integrated circuit 5 of FIG. 2.

FIG. 3 is a more detailed diagram of the FM receive path. DSP 41 can be considered to include the following functional parts: a digital complex conjugate selector 66, a decimation digital filter 67, an IF rotator 68, a digital IF filter 69, and a control functionality 70. The control functionality 70 controls the frequency synthesizer 43, analog complex bandpass filter 38, and blocks 66-68 of DSP 41 by supplying control signals as illustrated. The SD ADCs 39 and 40 output digital values at a rate of 19.2 million samples per second, and after decimation digital values pass through the IF rotator at a rate of 2.4 million values per second. A mode signal 96 indicates which one of a plurality of cellular telephone modes it is that the cellular telephone circuitry (see reference numerals 2, 8, 9, 14, 3 and 4 of FIG. 2) is operating in. The cellular telephone mode information originates in processor 16 of the digital baseband integrated circuit 4, and is communicated in the form of mode signal 96 via serial bus 24 to the control functionality 70 in the DSP 41 of the FM transmitter/receiver integrated circuit 5. The digital IF filter 69 of FIG. 3 functions to remove unwanted adjacent channel interference and out of band noise (such as unwanted FM stations), and to pass the FM station to which the FM receiver is being tuned on to the FM demodulation portion (not shown) of DSP 41. In the present example, digital IF filter 69 has a 100 kHz center frequency. This 100 kHz center frequency remains fixed regardless of the operating mode of the FM receiver, regardless of what FM station is to be received, and regardless of the cellular telephone operating mode.

Figure 4:
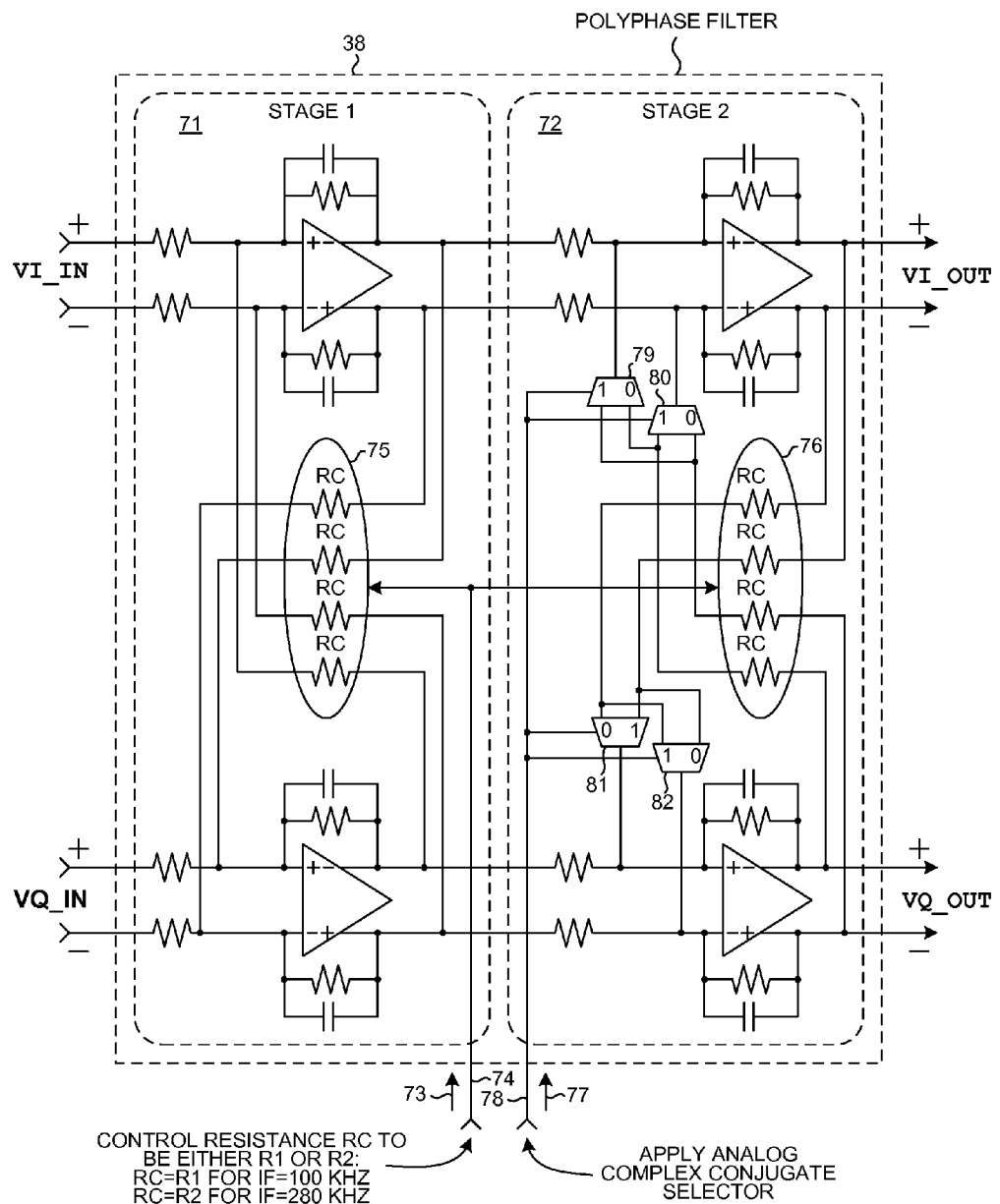
FIG. 4 is a diagram of the analog complex bandpass filter 38 of FIG. 3.

FIG. 4 is a diagram of analog complex bandpass filter 38 of FIG. 3. Analog complex bandpass filter 38 is a polyphase filter that includes a first stage 71 and a second stage 72. The center frequency of the bandpass filter can be set to either 100 kHz or to 280 kHz, depending on the value of a digital signal 73 on conductor 74. The digital value sets the resistance RC of the programmable resistances 75 and 76 to be either R1 (for a center frequency of 100 kHz) or to be R2 (for a center frequency of 280 kHz). If the digital control signal 77 on conductor 78 has a first digital value then no analog complex conjugate selector operation is performed, but if digital control signal 77 has a second digital control value then multiplexers 79-82 are controlled to switch the feedback signals in the second stage 72 such that an analog complex conjugate selection operation occurs.

FIG. 5 is a diagram of IF rotator 68 of FIG. 3. A stream of digital I quadrature signal values is received from SD ADC 39 via conductors 84. A stream of digital Q quadrature signal values is received from SD ADC 40 via conductors 85. Corresponding pairs of I and Q values are combined by a real-to-complex block 85 into complex values. One such complex value is represented in FIG. 5 as I+jQ. A complex multiplication operation is then performed as represented by symbol 86. Complex multiplication operation 86 multiplies each I+jQ complex value by a corresponding complex value C[N]−jS[N] received. Line 87 represents the receipt of a stream of such C[N]−jS[N] from control functionality 70 of FIG. 3. The complex multiplication operation results in a stream of 23-bit signed complex numbers. Line 88 represents this stream. The "23SC" notation indicates 23-bit signed complex. The stream of 23-bit signed complex numbers 88 is then rounded by operation 89 into a stream of 15-bit complex signed numbers 90. The stream 90 of 15-bit signed complex values is processed by an asymmetric saturation operation (ASAT) 91 into a stream of 13-bit signed complex values 92. If frequency shifting is to be performed by IF rotator 68, then multiplexing functionality 93 passes stream 92 to the output 94 of the IF rotator 68. Line 95 represents the receipt of SHIFT FREQUENCY control information from control functionality 70 of FIG. 3. If IF rotator 68 is not to perform frequency shifting, then the SHIFT FREQUENCY information on line 95 controls the multiplexing functionality 93 to pass the stream of I+jQ complex values to the output 94 without frequency shifting.

FIG. 6 illustrates how the complex multiplication operation 86 performs frequency shifting. If a 280 kHz sequence of I+jQ complex values is multiplied by a −180 kHz sequence of C[N]-jS[N] complex values, the result is a 100 kHz sequence of 23-bit signed complex values 88.

FIG. 7 is a diagram that illustrates the C[N] and S[N] values of the sequence of C[N]-jS[N] values supplied (as indicated by line 87) to complex multiplication functionality 86. Each C[N] value is a 13-bit number. Each S[N] value is a 13-bit number. Over discrete time, the sample index [N] increments continuously such that the changing C[N] values trace a cosine wave, and such that the changing S[N] values trace a sine wave. The frequency of the cosine and sine waves is −180 kHz.

FIG. 8 is a table that illustrates the cosine C[N] and sine S[N] values for each sample index value N.

FIG. 9 is a diagram that illustrates the digital complex conjugate selector 66 of FIG. 3. As represented by FIG. 9, the I portion of each set of I and Q values passes through the digital complex conjugate selector 66 unaffected, but the Q portion is multiplied by negative one if the digital complex conjugate selector 66 is being controlled to perform the digital complex conjugate selector function. Multiplying the Q portion in this way is referred to as applying the digital complex conjugate selector.

FIG. 10 is a table that illustrates an operation of the FM receiver 31 of FIG. 2. Depending on the operating environment of FM receiver 31 and the FM station to be received, the following portions of the FM receiver are controlled differently: frequency synthesizer 43, analog complex bandpass filter 38, digital complex conjugate selector 66, decimation digital filter 67, and IF rotator 68. As represented by the column labeled "EXAMPLE #1", if the cellular telephone functionality of device 1 is operating in the CDMA 1X cellular telephone mode and if the FM receiver is to be receiving an FM station centered in the 93.85 MHz to 93.95 MHz band, then frequency synthesizer 43, analog complex bandpass filter 38, and portions 66-68 of DSP 41 are controlled as indicated in the "EXAMPLE #1" column. If cellular telephone functionality of device 1 is operating in the WCDMA cellular telephone mode and if the FM receiver is to be receiving an FM station centered in the 93.85 MHz to 94.15 MHz band, then frequency synthesizer 43, analog complex bandpass filter 38, and portions 66-68 of DSP 41 are controlled as indicated in the "EXAMPLE #2" column. If, however, the cellular telephone functionality of device 1 is operating in the WCDMA cellular telephone mode and if the FM receiver is to be receiving an FM station centered in the 93.65 MHz to 93.8 MHz band, then frequency synthesizer 43, analog complex bandpass filter 38, and portions 66-68 of DSP 41 are controlled as indicated in the "EXAMPLE #3" column. In one example, the cellular telephone operating mode information is received into the control functionality 70 of FIG. 3 from digital baseband integrated circuit 4 of FIG. 1 via serial bus 24. Operation of FM receiver 31 in these three examples is depicted and described below in connection with FIGS. 11-31.

Figure 11:
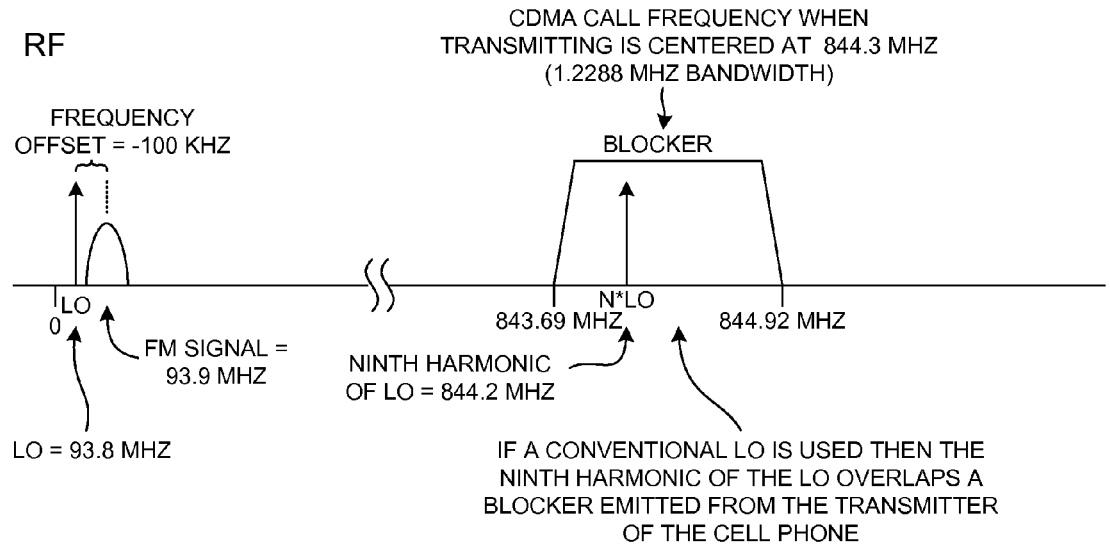
FIG. 11 illustrates a problem that might be encountered if a conventional LO frequency were used in the presence of a CDMA blocker.

FIG. 11 illustrates operation of a conventional FM receiver. To downconvert an FM signal centered at 93.9 MHz as in the "EXAMPLE #1" of the table of FIG. 10, the conventional FM receiver typically uses a local oscillator LO signal at 93.8 MHz that is 100 kHz away from the 93.9 MHz FM signal as illustrated. When the FM signal and the LO signal are mixed in the mixer (such as mixer block 37 of FIG. 2 and FIG. 3), the FM signal is downconverted so that it is centered at the 100 kHz center frequency of the digital IF filter of the receiver. Unfortunately, however, the ninth harmonic of the LO signal is located at 844.2 MHz as illustrated in FIG. 11. If a cellular telephone transceiver is located close to the FM receiver, and if the cellular telephone is operating in accordance with a CDMA 1X protocol, then a strong wideband blocker may be present at the CDMA call frequency. This wideband blocker ranges from 843.69 MHz to 844.92 MHz where the wideband blocker has a 1.2288 MHz bandwidth. As a result, the wideband blocker overlaps the ninth harmonic of LO in frequency.

The two signals can, for example, be 100 kHz from one another such that the blocker is harmonically mixed and downconverted to 100 kHz. The unwanted 100 kHz blocker/LO harmonic signal therefore will pass through digital IF filter 69 along with the wanted downconverted FM signal to be demodulated.

Figure 12:
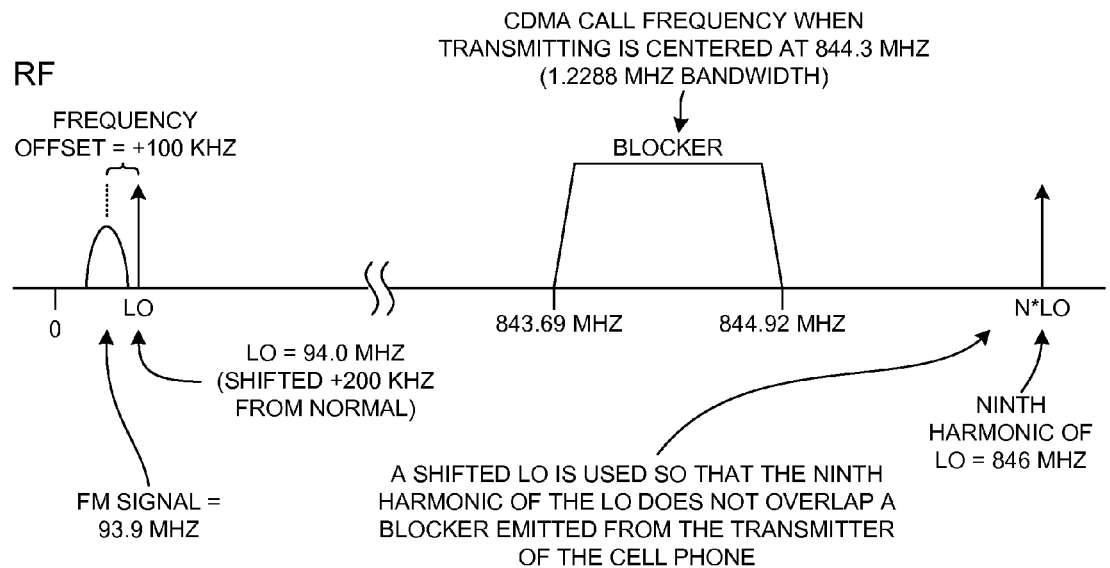
FIG. 12-16 illustrate steps of a method of processing of an FM signal in the presence of the CDMA blocker using a shifted LO.

FIG. 12 illustrates a first step in the operation of FM receiver 31 in EXAMPLE #1 of FIG. 10. FM signal 25 (see signal 25 in FIG. 3) having a center frequency of 93.9 MHz is to be received. Frequency synthesizer 43 is controlled to supply a LO signal 42 that is not at 93.8 MHz as would be conventional, but rather is shifted by +200 kHz to a frequency of 94.0 MHz. Due to the use of the different LO signal 42, the ninth harmonic of the LO is located at 846 MHz. 846 MHz is not within the 843.69 MHz to 844.92 MHz range of the CDMA call blocker. The harmonic mixing problem described above in connection with FIG. 11 therefore does not occur.

Figure 13:
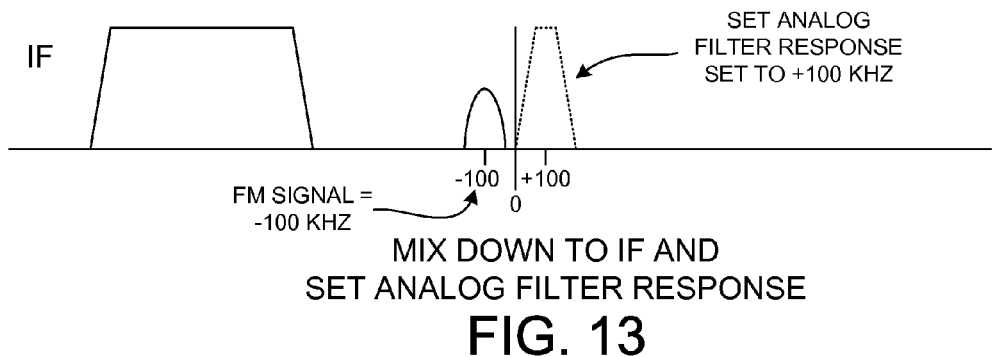

FIG. 13 illustrates a second step. After FM signal 25 is downconverted by mixer block 37, the "downconverted FM signal" 97 (see signal 97 in FIG. 3) has a frequency of −100 kHz. Analog complex bandpass filter 38 is controlled to have a filter response centered at +100 kHz.

Figure 14:
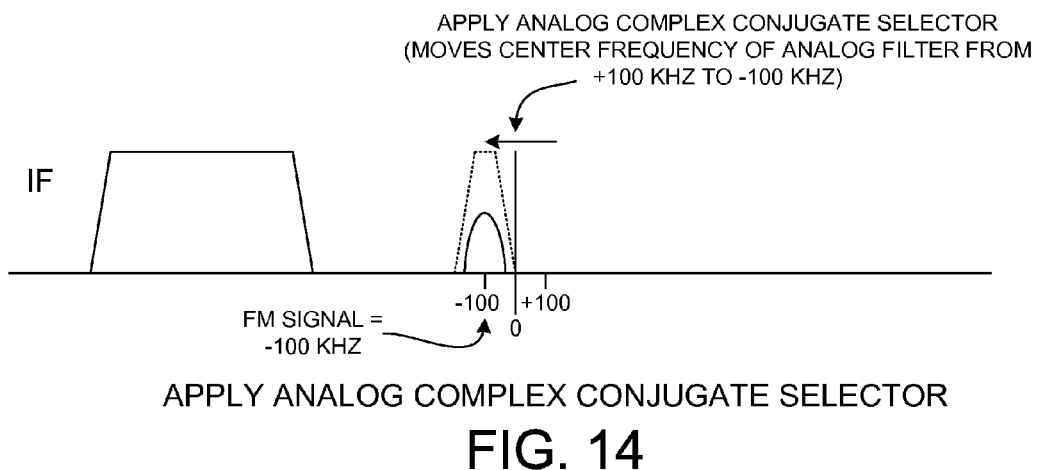

FIG. 14 illustrates a third step. Analog complex bandpass filter 38 is controlled to perform the analog complex conjugate selector function. The center frequency of the analog filter is therefore changed from +100 kHz to −100 kHz. As illustrated in FIG. 14, the result is the filter response being properly centered with respect to the −100 kHz FM signal.

Figure 15:
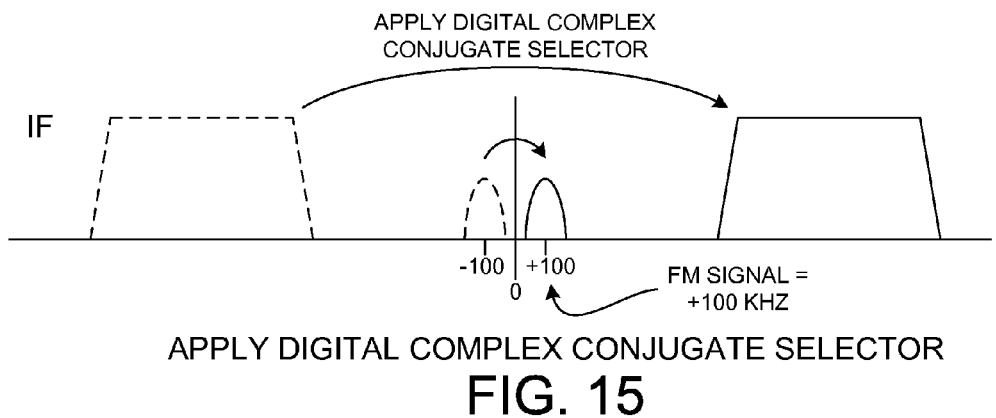

FIG. 15 illustrates a fourth step. Digital complex conjugate selector 66 is controlled to perform the digital complex conjugate selector function. The FM signal is mirrored from being centered at −100 kHz to being centered at +100 kHz. IF rotator 68 is controlled so that it does not perform any frequency shifting.

Figure 16:
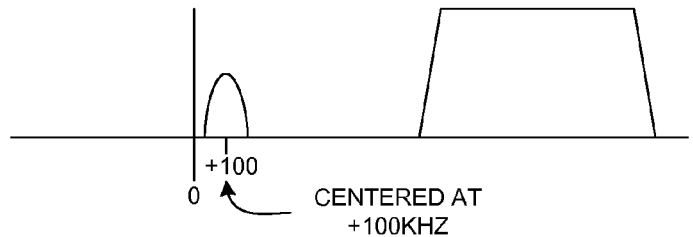

FIG. 16 illustrates the result of the first through fourth steps. The resulting "processed FM signal" (see signal 98 in FIG. 3) is properly centered at +100 kHz and it is supplied to the digital IF filter 69 (see FIG. 3). Due to the use of the LO signal of 94.0 MHz (rather than a conventional LO signal of 93.8 MHz), however, the harmonic mixing problem described above in connection with FIG. 11 does not occur.

Figure 17:
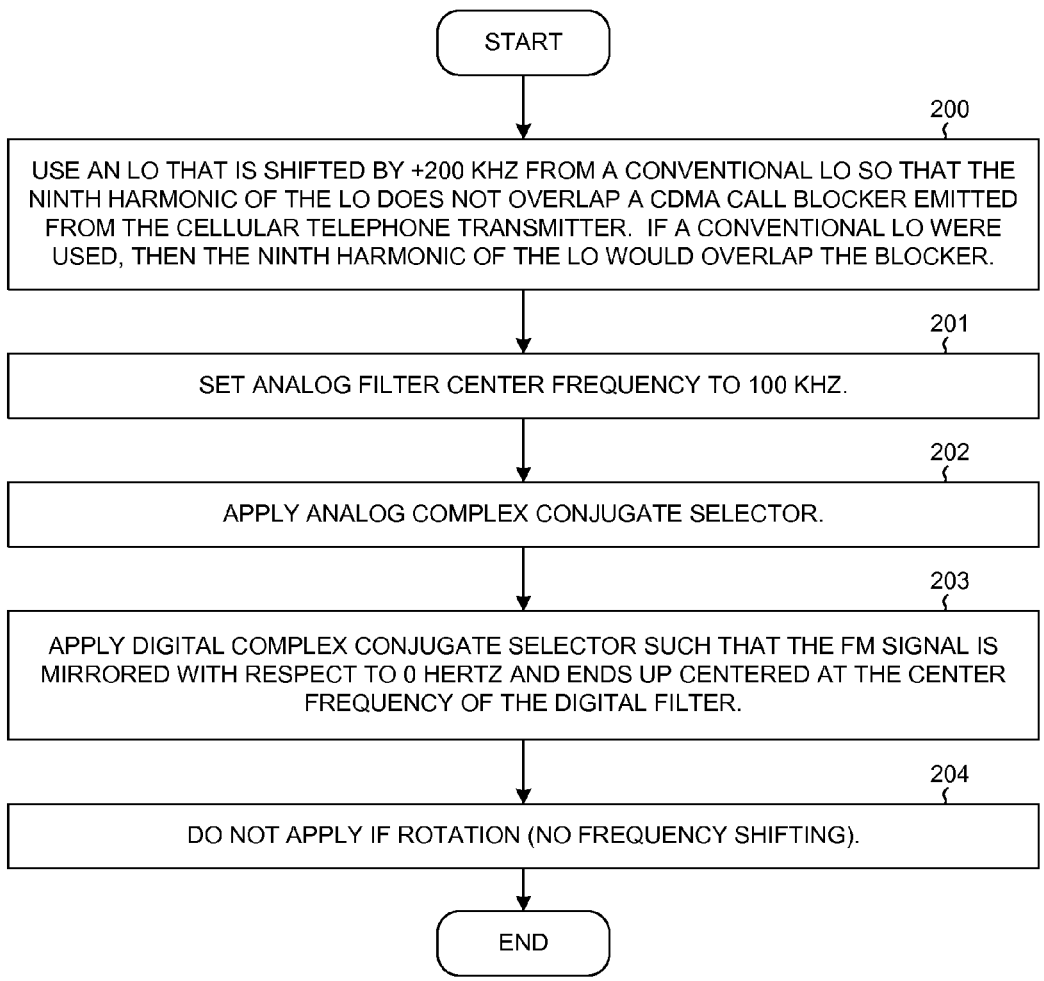
FIG. 17 is a flowchart of the method set forth in FIGS. 12-16.

FIG. 17 is a flowchart that illustrates how the various parts of the FM receiver 31 are controlled in the "EXAMPLE #1" column of FIG. 10. In step 200, the frequency synthesizer 43 is controlled to output of LO that is shifted by +200 kHz from the conventional LO frequency. In step 201, the analog complex bandpass filter 38 is controlled to have a 100 kHz center frequency. In step 202, the analog complex bandpass filter 38 is controlled to apply the analog complex conjugate selector function. In step 203, the digital complex conjugate selector 66 is controlled to perform the digital complex conjugate selector function. The IF rotator 68 does not perform (step 204) any frequency shifting operation. In one example of carrying out the method of FIG. 17, the control functionality 70 of DSP 41 supplies digital control values INT, FRAC, APPLY ANALOG COMPLEX CONJUGATE SELECTOR, APPLY DIGITAL COMPLEX CONJUGATE SELECTOR, C[N], S[N], and SHIFT FREQUENCY to functional portions 43, 38, 66, 67, 68 and 69 as illustrated in FIG. 3. Although the steps of the flowchart of FIG. 17 are set forth in an order, the steps are not really steps but are rather operations or functions and can be performed in any order and are typically performed more or less simultaneously. The various operations or functions are broken down and illustrated separately in the flowchart for instructional purposes.

Figure 18:
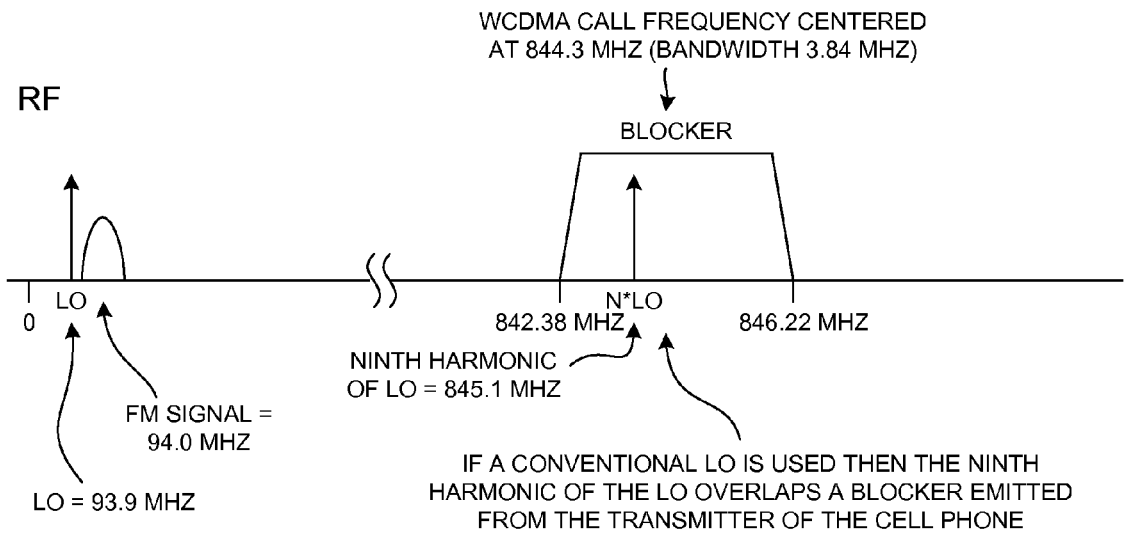
FIG. 18 illustrates a problem that might be encountered if a conventional LO frequency were used in the presence of a WCDMA blocker when the FM signal being received is in a first frequency range.

FIG. 18 illustrates operation of a conventional FM receiver in the situation of "EXAMPLE #2" of the table of FIG. 10. To downconvert an FM signal centered at 94.0 MHz, the conventional FM receiver typically uses a local oscillator LO signal that is 100 kHz away from the 94.0 MHz FM signal at 93.9 MHz. When the FM signal and the LO signal are mixed in the mixer (such as mixer block 37 of FIG. 2), the FM signal is downconverted so that it is centered at the 100 kHz center frequency of the digital IF filter 69. Unfortunately, however, the ninth harmonic of the LO signal is located at 845.1 MHz as illustrated in FIG. 18. If a cellular telephone transceiver is located close to the FM receiver, and if the cellular telephone is operating in accordance with a WCDMA protocol, then a strong wideband blocker may be present at the WCDMA call frequency. This wideband blocker ranges from 842.38 MHz to 846.22 MHz where the wideband blocker has a 3.84 MHz bandwidth. As a result, the blocker overlaps the ninth harmonic of LO in frequency. The two signals can, for example, be 100 kHz from one another such that harmonic mixing occurs, the result being a downconverted signal that is located at 100 kHz. The undesired 100 kHz blocker/LO harmonic signal therefore will pass through digital IF filter 69 along with the desired downconverted FM signal to be demodulated.

Figure 19:
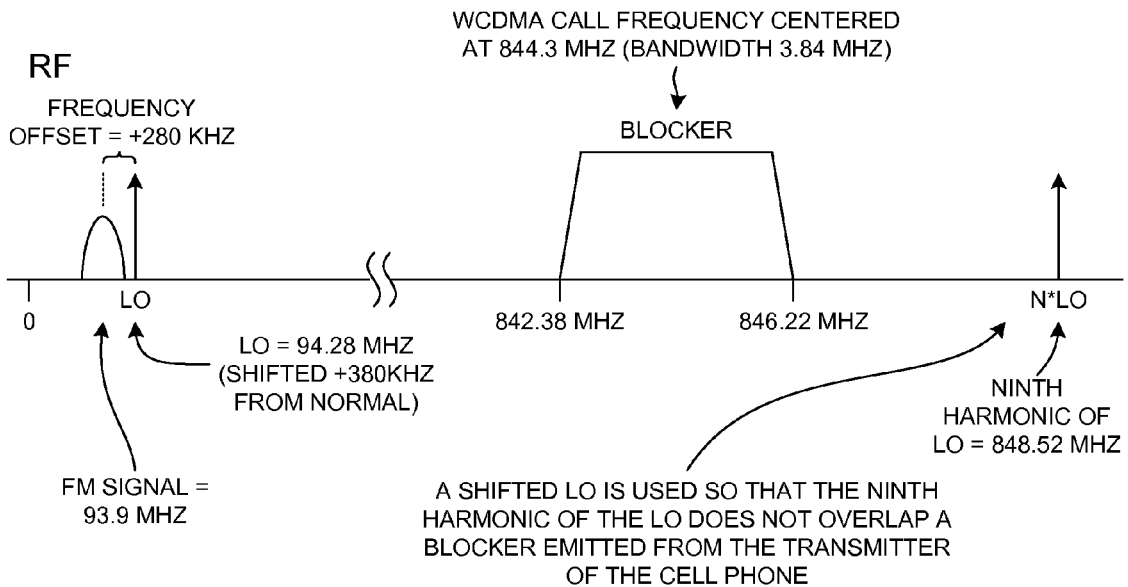
FIG. 19-24 illustrate steps of a method of processing of an FM signal in the presence of a WCDMA blocker using a shifted LO when the FM signal being received is in a first frequency range.

FIG. 19 illustrates a first step in the operation of FM receiver 31 in EXAMPLE #2 of FIG. 10. FM signal 25 (see signal 25 of FIG. 3) having a 93.9 MHz center frequency is to be received. Frequency synthesizer 43 is controlled to supply a LO signal 42 that is not at 93.9 MHz as would be conventional, but rather is shifted by +380 kHz from the normal LO frequency to have a frequency of 94.28 MHz. The ninth harmonic of the LO is therefore located at 848.52 MHz and is not within the 842.38 MHz to 846.22 MHz frequency range of the WCDMA call blocker.

Figure 20:
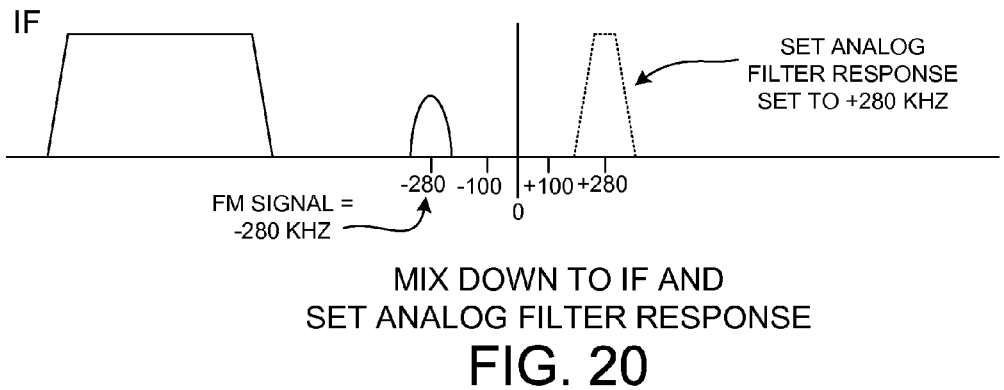

FIG. 20 illustrates a second step in the operation of FM receiver 31 in EXAMPLE #2 of FIG. 10. After mixing in mixer block 37, the "downconverted FM signal" (see signal 97 of FIG. 3) is centered at −280 kHz. The analog complex bandpass filter 38 is controlled to have a filter response centered at +280 kHz as illustrated.

Figure 21:
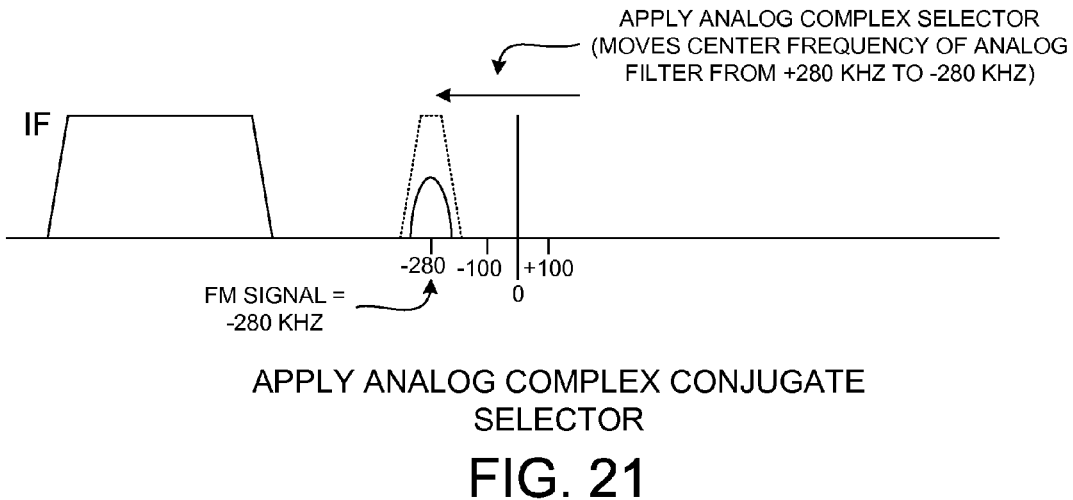

FIG. 21 illustrates a third step in the operation of FM receiver 31 in EXAMPLE #2 of FIG. 10. The analog complex bandpass filter 38 is controlled to perform its analog complex conjugate selector function. As a result, the center frequency of filter 38 is set to have a center frequency of −280 kHz.

Figure 22:
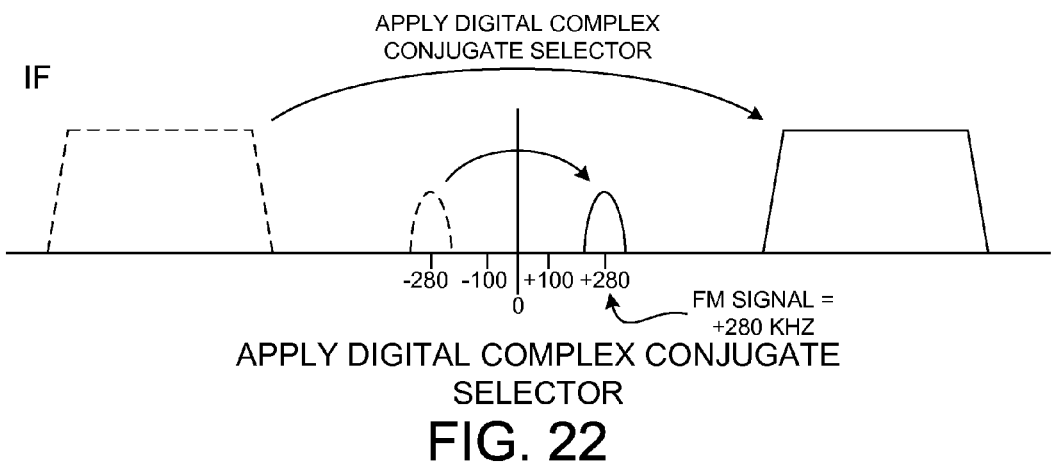

FIG. 22 illustrates a fourth step in the operation of FM receiver 31 in EXAMPLE #2 of FIG. 10. Digital complex conjugate selector 66 is controlled to perform its digital complex conjugate selector function. The FM signal is therefore centered at +280 kHz as illustrated.

Figure 23:
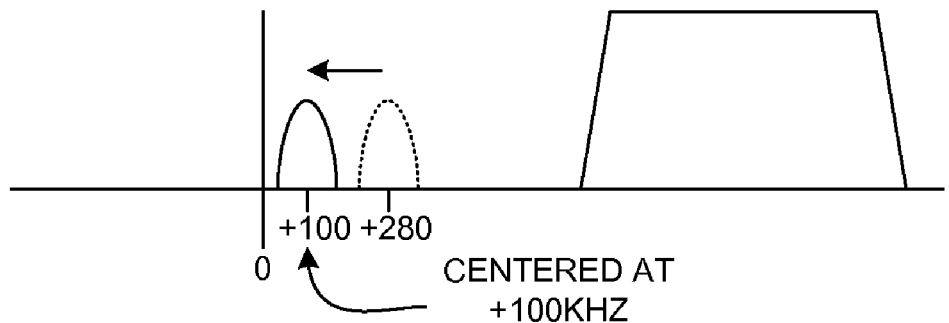

FIG. 23 illustrates a fifth step in the operation of FM receiver 31 in EXAMPLE #2 of FIG. 10. IF rotator 68 is controlled to perform its frequency shifting function. The FM signal is shifted by −180 kHz so that it is centered at +100 kHz.

Figure 24:
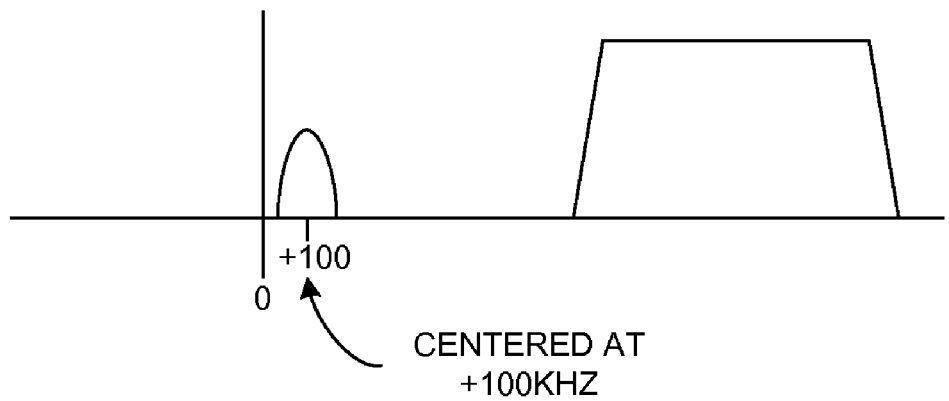

FIG. 24 illustrates the result of the first through fifth steps. The "processed FM signal" 98 (see signal 98 of FIG. 3) is properly centered at +100 kHz and it is supplied to the digital IF filter 69 (see FIG. 3). Due to the use of the LO signal of 94.18 MHz (rather than a conventional LO signal of 93.80 MHz), however, the harmonic mixing problem described above in connection with FIG. 18 does not occur.

Figure 25:
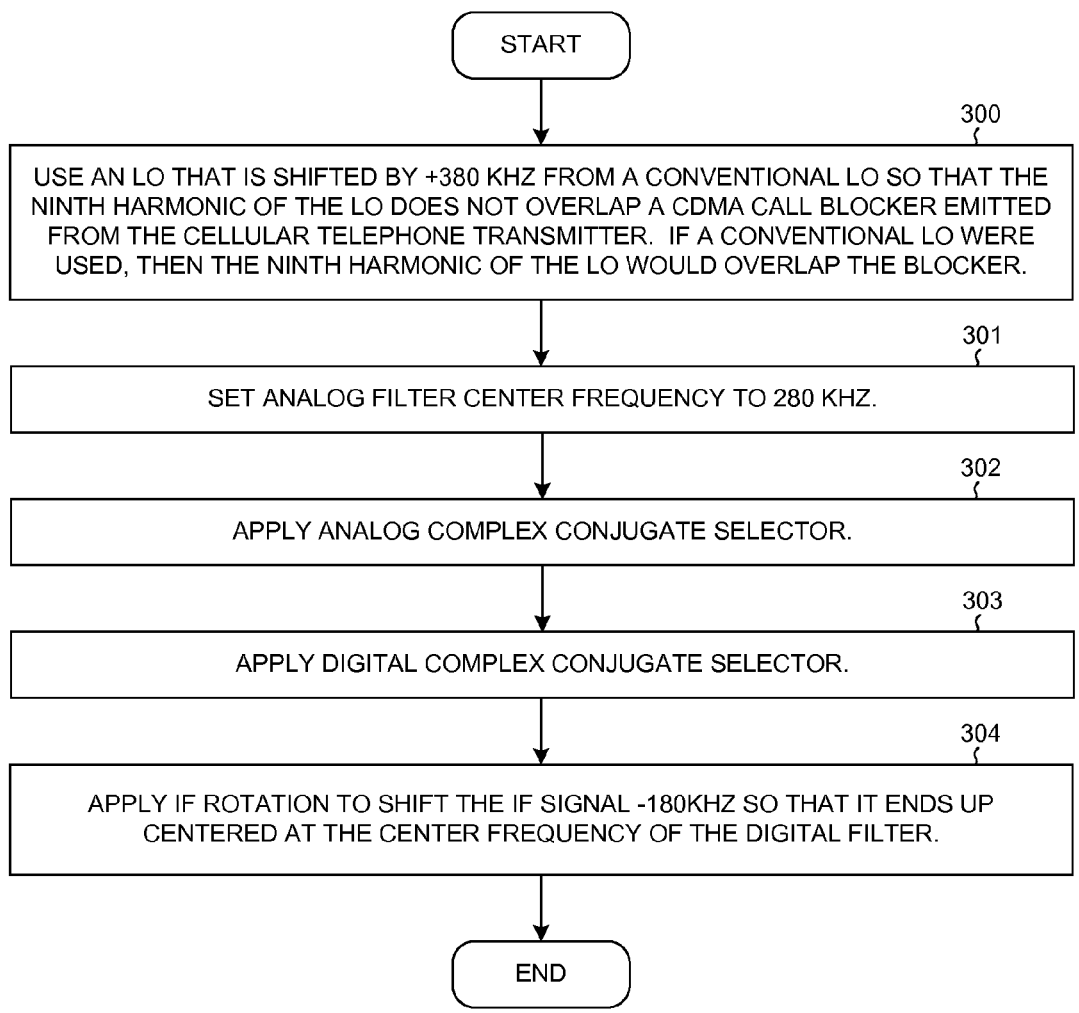
FIG. 25 is a flowchart of the method set forth in FIGS. 19-24.

FIG. 25 is a flowchart that illustrates how the various parts of the FM receiver 31 are controlled in the "EXAMPLE #2" column of FIG. 10. In step 300, the frequency synthesizer 43 is controlled to output of LO that is shifted by +380 kHz from the conventional LO frequency. In step 301, the analog complex bandpass filter 38 is controlled to have a 280 kHz center frequency. In step 302, the analog complex bandpass filter 38 is controlled to apply the analog complex conjugate selector function. In step 303, the digital complex conjugate selector 66 is controlled to perform the digital complex conjugate selector function. In step 304, the IF rotator 68 is controlled to perform its frequency shifting operation.

Figure 26:
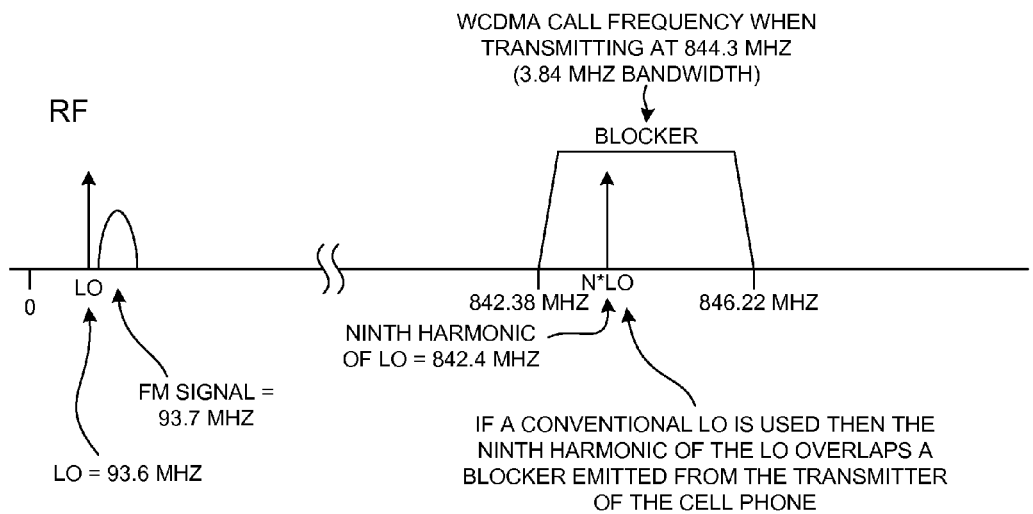
FIG. 26 illustrates a problem that might be encountered if a conventional LO frequency were used in the presence of a WCDMA blocker when the FM signal being received is in a second frequency range.
Figure 27:
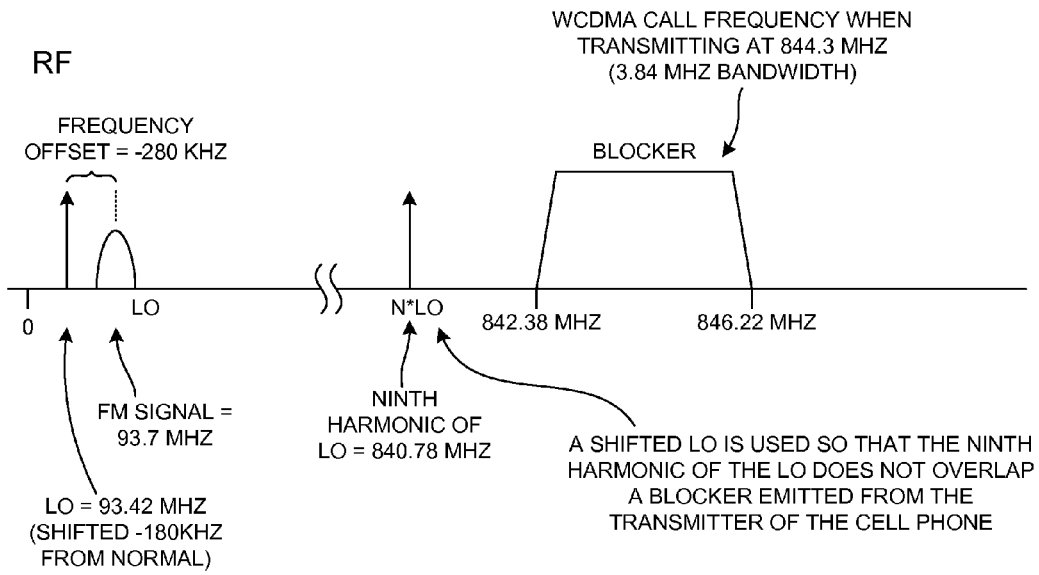
FIG. 27-30 illustrate steps of a method of processing of an FM signal in the presence of a WCDMA blocker using a shifted LO when the FM signal being received is in a second frequency range.

FIG. 26 illustrates operation of a conventional FM receiver in the situation of "EXAMPLE #3" of the table of FIG. 10. To downconvert an FM signal centered at 93.7 MHz, the conventional FM receiver typically uses a local oscillator LO signal that is 100 kHz away from the 93.7 MHz FM signal at 93.6 MHz. When the FM signal and the LO signal are mixed in the mixer (such as mixer block 37 of FIG. 2), the FM signal is downconverted so that it is centered at the 100 kHz center frequency of the digital IF filter 69. Unfortunately, however, the ninth harmonic of the LO signal is located at 844.2 MHz as illustrated in FIG. 26. If a cellular telephone transceiver is located close to the FM receiver, and if the cellular telephone is operating in accordance with a WCDMA protocol, then a strong wideband blocker may be present at the WCDMA call frequency. This wideband blocker ranges from 842.38 MHz to 846.22 MHz where the wideband blocker has a 3.84 MHz bandwidth. As a result, the blocker overlaps the ninth harmonic of LO in frequency. The two signals can, for example, be 100 kHz from one another such that harmonic mixing occurs, the result being a downconverted signal that is located at 100 kHz. The undesired 100 kHz blocker/LO harmonic signal therefore will pass through digital IF filter 69 along with the desired downconverted FM signal to be demodulated FIG. 27 illustrates a first step in the operation of FM receiver 31 in EXAMPLE #3 of FIG. 10. FM signal 25 (see signal 25 of FIG. 3) centered at 93.7 MHz is to be received. Frequency synthesizer 43 is controlled to supply a LO signal 42 that is not at 93.6 MHz as would be conventional, but rather is shifted by −180 kHz from the normal LO frequency to have a frequency of 93.42 MHz. The ninth harmonic of the LO is therefore located at 840.78 MHz and is not within the 842.38 MHz to 846.22 MHz frequency range of the WCDMA call blocker.

Figure 28:
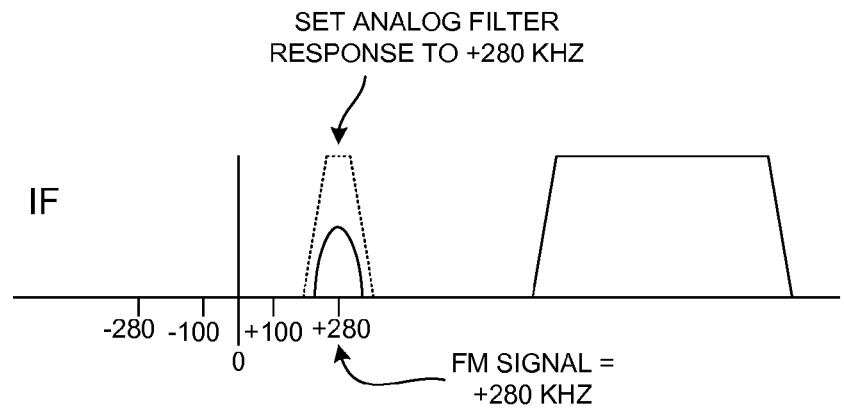

FIG. 28 illustrates a second step in the operation of FM receiver 31 in EXAMPLE #3 of FIG. 10. After mixing in mixer block 37, the "downconverted FM signal" 97 (see signal 97 in FIG. 3) is centered at +280 kHz. The analog complex bandpass filter 38 is controlled to have a filter response centered at +280 kHz as illustrated. The analog complex bandpass filter 38 is controlled so that it does not perform any analog complex conjugate selector function.

Figure 29:
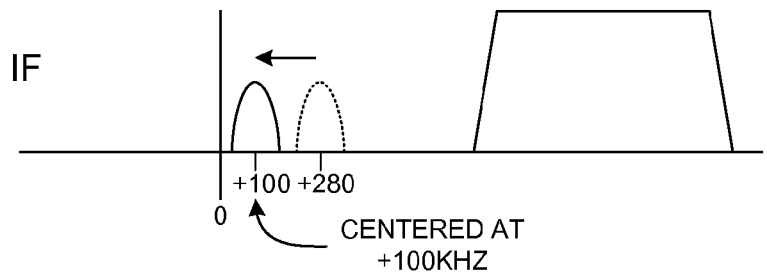

FIG. 29 illustrates a third step in the operation of FM receiver 31 in EXAMPLE #3 of FIG. 10. IF rotator 68 shifts the frequency of the FM signal by −180 kHz so that it is centered at +100 kHz as illustrated.

Figure 30:
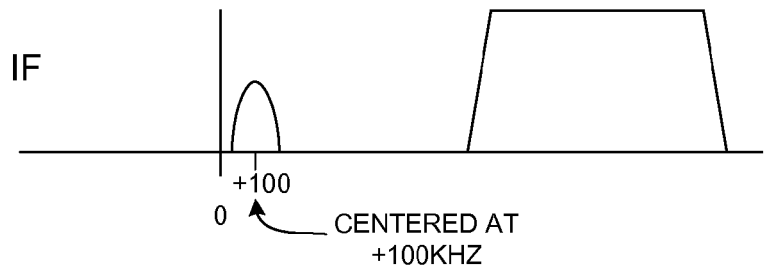

FIG. 30 illustrates the result of the first through third steps. The resulting "processed FM signal" 98 (see signal 98 in FIG. 3) is properly centered at +100 kHz and it is supplied to the digital IF filter 69 (see FIG. 3). Due to the use of the LO signal of 93.42 MHz (rather than a conventional LO signal of 93.70 MHz), however, the harmonic mixing problem described above in connection with FIG. 26 does not occur.

Figure 31:
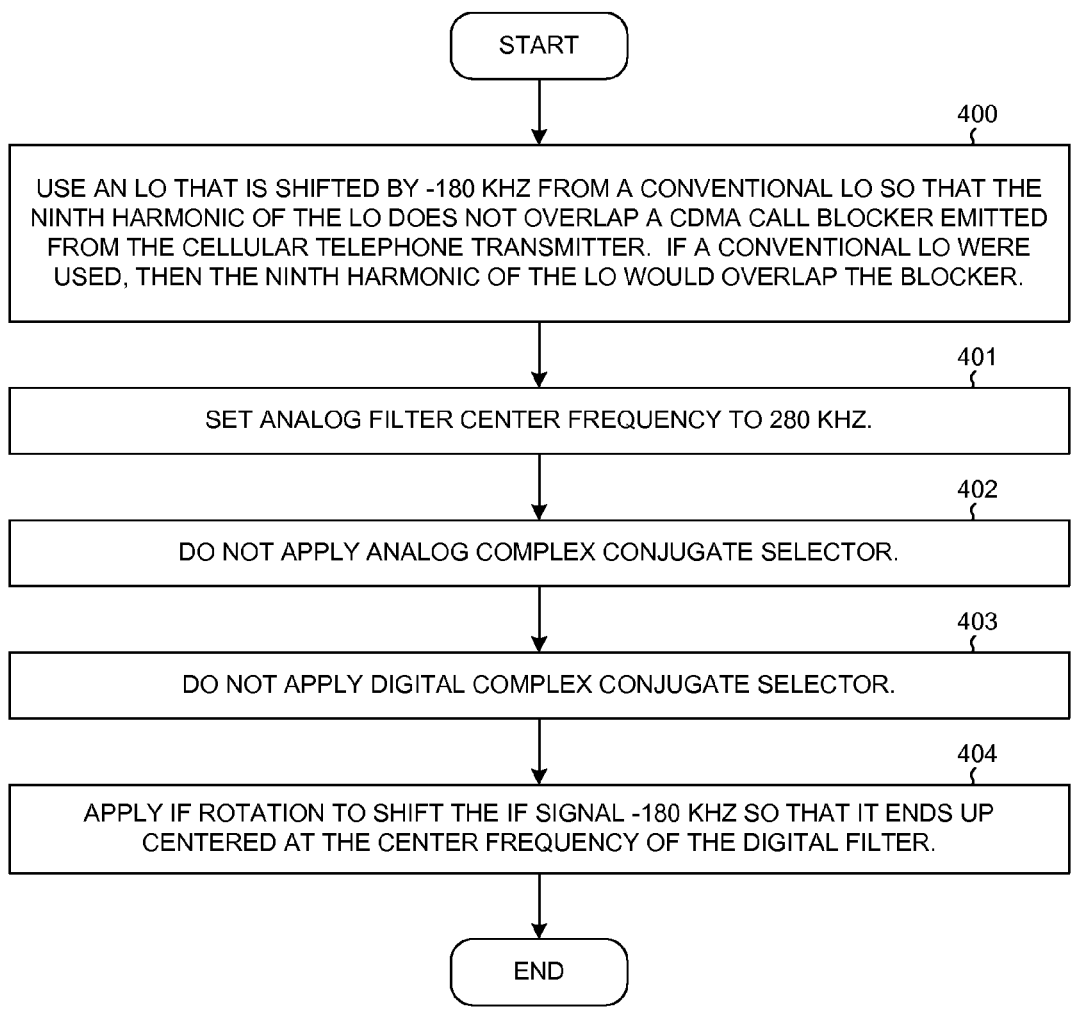
FIG. 31 is a flowchart of the method set forth in FIGS. 27-30.

FIG. 31 is a flowchart that illustrates how the various parts of the FM receiver 31 are controlled in the "EXAMPLE #3" column of FIG. 10. In step 400, the frequency synthesizer 43 is controlled to output of LO that is shifted by −180 kHz from the conventional LO frequency. In step 401, the analog complex bandpass filter 38 is controlled to have a 280 kHz center frequency. Step 402 indicates that the analog complex bandpass filter 38 is controlled so that it does not perform its analog complex conjugate selector function. Step 403 indicates that the digital complex conjugate selector 66 is controlled so that it does not perform its digital complex conjugate selector function. In step 404, the IF rotator 68 is controlled to shift the frequency of the FM signal by −180 kHz so that the FM signal is centered at +100 kHz.

In a radio receiver such as FM receiver 31 of FIG. 3, there may be a practical limit to how much the frequency of the LO can be varied from its conventional frequency without unduly compromising performance of the FM receiver. Accordingly, in order to prevent unwanted mixing of LO harmonics with a wideband blocker signal, different LO frequency shifts and different combinations of settings of the parts 38, 66, 67 and 68 of FIG. 3 are used to prevent interference with different parts of the wideband blocker bandwidth. By using this technique, the maximum amount of LO shifting is 380 kHz in this particular example. In this particular example, the term "wideband blocker" refers to a blocker having a bandwidth of at least 200 kHz.

FIG. 10 illustrates a situation in which interference with a WCDMA wideband blocker is handled in different ways depending on the center frequency of the FM signal being received. As indicated in the table of FIG. 10, if the FM signal being received has a center frequency in a first range of 93.85 MHz to 94.15 MHz then the LO signal 42 is controlled to have a frequency offset (frequency difference between the FM signal center frequency and the LO frequency) of +280 kHz. This scenario is set forth in the column labeled "EXAMPLE #2" in FIG. 10. If, however, the FM signal being received has a center frequency in a second range of 93.65 MHz to 93.80 MHz then the LO signal 42 is controlled to have a frequency offset (frequency difference between the FM signal center frequency and the LO frequency) of −280 kHz. This scenario is set forth in the column labeled "EXAMPLE #3" in FIG. 10. Accordingly, potential LO harmonic interference with blocker signals in different portions of the frequency range of a wideband blocker is handled in different ways. By using a first LO frequency shift for FM signals centered in the first range and by using a second LO frequency shift for FM signals centered in the second range, the maximum amount of LO shifting required is reduced as compared to the LO shifting that would otherwise have been required if only one way of handling the potential LO harmonic interference problem had been employed to cover the entire bandwidth of the wideband blocker.

Figure 32:
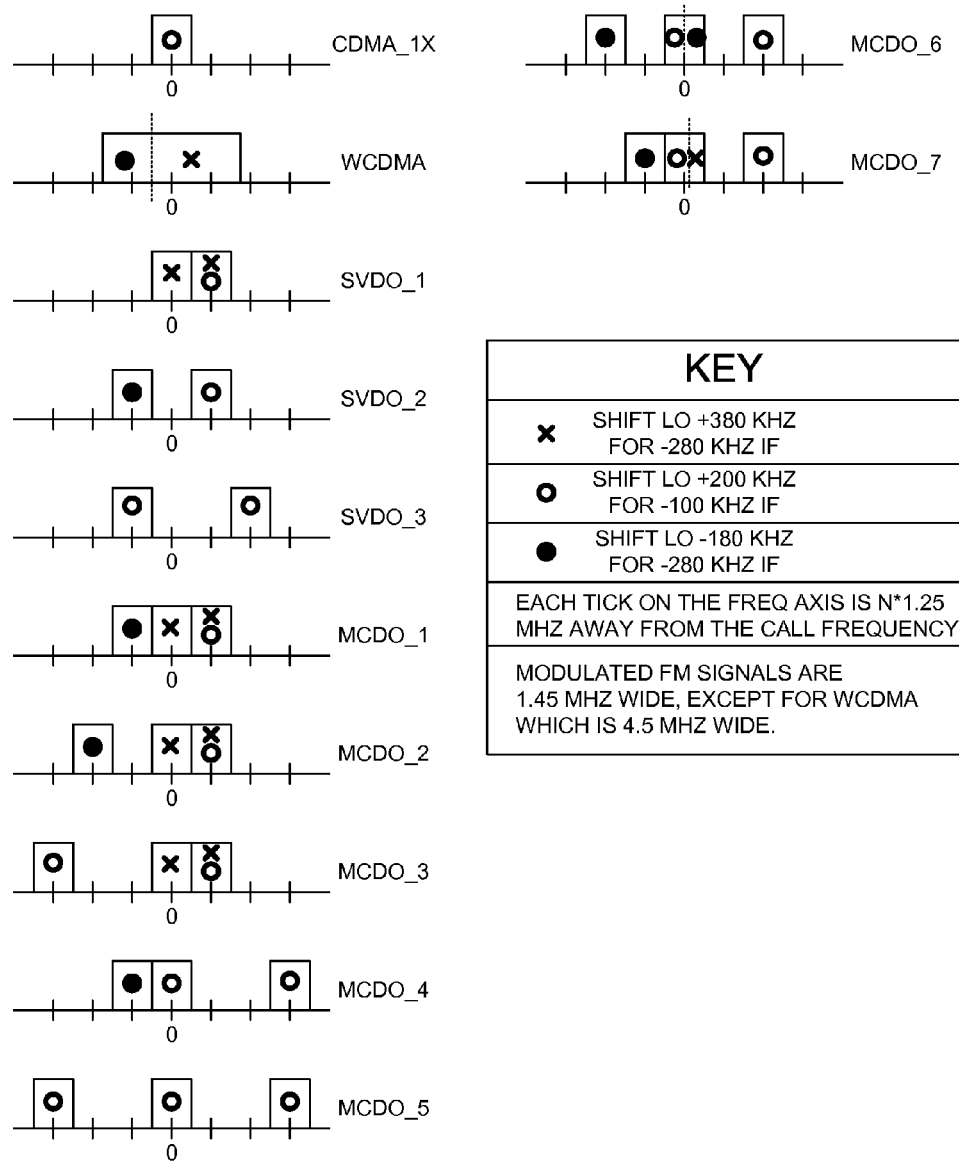
FIG. 32 is a diagram that sets forth how LO shifting can be performed to receive FM signals in the presence of numerous different wideband blocker signals.

FIG. 32 shows how different LO frequency shifts and different settings of parts 38, 66, 67 and 68 of the receiver of FIG. 3 are used when the cellular telephone circuitry 27 and 33 operates in different cellular telephone modes. The cellular telephone modes shown in FIG. 32 are: CDMA_1x, WCDMA, SVDO_1, SVDO_2, SVDO_3, MCDO_1, MCDO_2, MCDO_3, MCDO_4, MCDO_5, MCDO_6 and MCDO_7. The upper left diagram labeled "CMDA_1X" in FIG. 32 corresponds to the "EXAMPLE #1" column of FIG. 10. As indicated, the same LO frequency shift is used regardless of where in the wideband blocker frequency range the ninth harmonic of the FM signal lies. The second diagram down in the left column of the diagrams in FIG. 32 labeled "WCDMA" corresponds to the "EXAMPLE #2" and EXAMPLE #3" columns of FIG. 10. As indicated, a −180 kHz LO shift is employed if the ninth harmonic of the FM signal overlaps a first part (the left part in the illustration of FIG. 32) of the wideband blocker frequency range whereas a +380 kHz LO shift is employed if the ninth harmonic of the FM signal overlaps a second part (the right part in the illustration of FIG. 32) of the wideband blocker frequency range. The other diagrams of FIG. 32 in combination with the key at the right indicate how different LO shifting is performed depending on which part of the wideband blocker frequency ranges are overlapped by harmonics of the FM signal being received.

Although certain specific embodiments are described above for instructional purposes, the teachings of this patent document have general applicability and are not limited to the specific embodiments described above. The LO shifting methods may be carried out in a device other than the FM receiver within a cellular telephone. The LO shifting methods may be carried out in any FM receiver that would otherwise suffer from interference due to different blockers being emitted from a local circuit in different operating modes of the local circuit. The current operating mode in which the local circuit is operating need not be communicated to the FM circuit via a serial bus, but rather can be made known to the FM receiver by other means or can be determined by the FM receiver circuitry itself. The LO shifting technique can be employed with a digital IF filter whose center frequency is variable. Although a particularly advantageous use of the LO shifting technique described above involves using a single digital IF filter with a single fixed center frequency, the LO shifting technique can be used in a somewhat less advantageous way by using different LO shifts to avoid harmonic mixing problems but using one or more digital IF filters having different center frequencies depending on the LO shift employed. In such less advantageous applications, a single digital IF filter having an adjustable center frequency can be used or multiple digital IF filters each having a different center frequency can be used. Accordingly, various modifications, adaptations, and combinations of the various features of the described specific embodiments can be practiced without departing from the scope of the claims that are set forth below.

What is claimed is:

1. A method comprising:
   (a) receiving an FM signal and using a local oscillator signal (LO) to downconvert the FM signal thereby generating a downconverted FM signal, wherein the downconverted FM signal has a center frequency, and wherein the LO is offset in frequency with respect to center frequency by a frequency offset;
   (b) processing the downconverted signal such that a processed FM signal is generated, wherein the processed FM signal has a center frequency;
   (c) supplying the processed FM signal to a digital Intermediate Frequency (IF) filter, wherein the digital IF filter has a center frequency that is substantially equal to the center frequency of the processed FM signal;
   (d) receiving a mode signal indicative of whether a cellular telephone circuit coupled to an FM receiver is operating in a first mode or in a second mode, wherein the receiving and downconverting of (a) and the processing of (b) and the supplying of (c) and the receiving of (d) all are performed by the FM receiver;
   (e) setting the frequency of the LO used in (a) such that the frequency offset has a first value if the mode signal received in (d) indicates that the cellular telephone circuit is operating in the first mode; and
   (f) setting the frequency of the LO used in (a) such that the frequency offset has a second value if the FM signal has a center frequency that is in a first range and if the mode signal received in (d) indicates that the cellular telephone circuit is operating in the second mode, wherein the center frequency of the digital IF filter is substantially the same in (e) and (f).

2. The method of claim 1, further comprising:
(g) setting the frequency of the LO used in (a) such that the frequency offset has a third value if the FM signal has a center frequency that is in a second range and if the mode signal received in (d) indicates that the cellular telephone circuit is operating in the second mode, wherein the center frequency of the digital IF filter is substantially the same in (e), (f) and (g).

3. The method of claim 2, wherein the frequency offset of the first value in (e) is substantially equal to the center frequency of the digital IF filter if the cellular telephone circuit is not emitting a blocker that would significantly interfere with the FM receiver receiving the FM signal were the FM receiver using the LO having the frequency offset of the first value.

4. The method of claim 3, wherein the FM receiver sets the LO frequency as in (e) if a wideband blocker is not being emitted from the cellular telephone circuit, whereas the FM receiver sets the LO frequency as in (f) if the wideband blocker is being emitted from the cellular telephone circuit and if the FM signal has a center frequency that is in the first range, whereas the FM receiver sets the LO frequency as in (g) if the wideband blocker is being emitted from the cellular telephone circuit and if the FM signal has a center frequency that is in the second range.

5. The method of claim 1, further comprising:
(g) determining whether the LO frequency will be set to have the frequency offset of the first value as in (e) or whether the LO frequency will be set to have the frequency offset of the second value as in (f) based at least in part on the mode signal.

6. The method of claim 1, further comprising:
(g) determining whether the LO frequency will be set to have the frequency offset of the first value as in (e) or whether the LO frequency will be set to have the frequency offset of the second value as in (f) based at least in part on the center frequency of the FM signal.

7. The method of claim 1, wherein the processing of (b) involves using an analog complex bandpass filter, wherein the analog complex bandpass filter is controlled to have a first frequency response when the LO frequency is set as in (e), and wherein the analog complex bandpass filter is controlled to have a second frequency response when the LO frequency is set as in (f).

8. The method of claim 1, wherein the processing of (b) involves using an analog complex bandpass filter, wherein the analog complex bandpass filter is controlled to perform an analog complex conjugate selector function when the LO frequency is set as in (f), and wherein the analog complex bandpass filter is controlled so that it does not perform any analog complex conjugate selector function when the LO frequency is set as in (e).

9. The method of claim 1, wherein the processing of (b) involves applying a digital complex conjugate selector function when the LO frequency is set as in (f), and wherein processing of (b) does not involve any digital complex conjugate selector function when the LO frequency is set as in (e).

10. The method of claim 1, wherein the processing of (b) involves using an IF rotator to perform a frequency shift function when the LO frequency is set as in (f), and wherein processing of (b) does not involve using any IF rotator to perform any frequency shift operation when the LO frequency is set as in (e).

11. The method of claim 1, wherein the processing of (b) involves: 1) using an analog complex bandpass filter to process the downconverted signal, 2) using at least one analog-to-digital converter to digitize a signal output from the analog complex bandpass filter, and 3) processing a digital signal output from said at least one analog-to-digital converter in a Digital Signal Processor (DSP) thereby generating the processed FM signal, wherein the DSP is configured to realize a digital complex conjugate selector and an IF rotator and the digital IF filter.

12. The method of claim 1, wherein the FM receiver and the cellular telephone circuit are both parts of a cellular telephone.

13. A method comprising:
using an FM receiver to receive an FM signal, wherein the FM receiver employs a mixer that downconverts the FM signal, wherein a first local oscillator signal (LO1) having a first frequency offset with respect to a center frequency of the FM signal is used to drive the mixer if a cellular telephone circuit coupled to the FM receiver is operating in a first mode, whereas a second local oscillator signal (LO2) having a second frequency offset with respect to the center frequency of the FM signal is used to drive the mixer if the cellular telephone circuit coupled to the FM receiver is operating in a second mode when the FM signal has a center frequency in a first range, whereas a third local oscillator signal (LO3) having a third frequency offset with respect to the center frequency of the FM signal is used to drive the mixer if the cellular telephone circuit coupled to the FM receiver is operating in the second mode when the FM signal has a center frequency in a second range.

14. The method of claim 13, further comprising:
processing a downconverted FM signal output by the mixer and thereby generating a processed FM signal, and supplying the processed FM signal to a digital IF filter, wherein the digital IF filter has the same center frequency regardless of whether the mixer is being driven by LO1, LO2, or LO3.

15. The method of claim 14, wherein the processing involves use of an IF rotator to shift a frequency of a signal thereby generating the processed FM signal supplied to the digital IF filter when the cellular telephone circuit is operating in the second mode, and wherein the processing does not involve any use of any IF rotator when the cellular telephone circuit is operating in the first mode.

16. The method of claim 14, wherein the processing involves use of a digital complex conjugate selector to negate a quadrature signal when the cellular telephone circuit is operating in the first mode, and wherein the processing involves use of the digital complex conjugate selector when the cellular telephone circuit is operating in the second mode when the center frequency of the FM signal in the first range, and wherein the processing does not involve use of the digital complex conjugate selector when the cellular telephone circuit is operating in the second mode when the center frequency of the FM signal in the second range.

17. A Frequency Modulation (FM) receiver comprising:
a mixer that receives a local oscillator signal (LO) and downconverts an FM signal thereby generating a downconverted FM signal, wherein the LO has a frequency, wherein the FM signal has a center frequency, and wherein the center frequency of the FM signal has a frequency offset with respect to the frequency of the LO;
a digital Intermediate Frequency (IF) filter having a center frequency;
processing circuitry that receives the downconverted FM signal, processes the downconverted FM signal thereby generating a processed FM signal, and supplies the processed FM signal to the digital IF filter, wherein the processing circuitry includes an analog complex bandpass filter, at least one analog-to-digital converter, a digital complex conjugate selector functionality, and an IF rotator functionality; and a control mechanism that in a first operating mode sets the frequency offset to have a first value and controls the processing circuitry such that the processed FM signal supplied to the digital IF filter has a center frequency that is substantially the same as the center frequency of the digital IF filter, and in a second operating mode sets the frequency offset to have a second value and controls the processing circuitry such that the processed FM signal supplied to the digital IF filter has a center frequency that is substantially the same as the center frequency of the digital IF filter, wherein the center frequency of the digital IF filter is substantially identical in the first and second operating modes.

18. The FM receiver of claim 17, wherein the control mechanism receives a mode signal indicative of whether a cellular telephone circuit coupled to the FM receiver is operating in a first cellular telephone operating mode or in a second cellular telephone operating mode, and wherein the control mechanism determines whether the FM receiver will operate in the first operating mode or in the second operating mode based at least in part on the mode signal.

19. The FM receiver of claim 17, wherein the control mechanism receives a mode signal indicative of whether a cellular telephone circuit coupled to the FM receiver is operating in a first cellular telephone operating mode or in a second cellular telephone operating mode, and wherein the control mechanism determines whether the FM receiver will operate in the first operating mode or in the second operating mode based at least in part on the center frequency of the FM signal.

20. The FM receiver of claim 17, wherein the FM receiver operates in the first operating mode if the center frequency of the FM signal falls in a first range and if the FM receiver is operating in the presence of a wideband cellular telephone blocker that would interfere with reception of the FM signal by the FM receiver if an LO having a frequency offset substantially equal to the center frequency of the digital IF filter were used, and wherein the FM receiver operates in the second operating mode if the center frequency of the FM signal falls in a second range and if the FM receiver is operating in the presence of a wideband cellular telephone blocker that would interfere with reception of the FM signal by the FM receiver if an LO having a frequency offset substantially equal to the center frequency of the digital IF filter were used, and wherein the frequency offset in both the first and second operating modes differs substantially from the center frequency of the digital IF filter.

21. A Frequency Modulation (FM) receiver comprising:

a mixer that receives a local oscillator signal (LO) and downconverts an FM signal thereby generating a downconverted FM signal, wherein the LO has a frequency, wherein the FM signal has a center frequency, and wherein the center frequency of the FM signal has a frequency offset with respect to the frequency of the LO;

a digital Intermediate Frequency (IF) filter having a center frequency; and means for processing the downconverted FM signal and thereby generating a processed FM signal, and for supplying the processed FM signal to the digital IF filter, wherein the means is also for determining whether the FM receiver will operate in a first operating mode or in a second operating mode depending at least in part on a cellular telephone mode signal, and wherein the means is also for: 1) in the first operating mode setting the frequency offset to have a first value such that the processed FM signal supplied to the digital IF filter has a center frequency that is substantially the same as the center frequency of the digital IF filter, and 2) in the second operating mode setting the frequency offset to have a second value such that the processed FM signal supplied to the digital IF filter has a center frequency that is substantially the same as the center frequency of the digital IF filter.

* * * * *